(12) United States Patent
Elkins et al.

(10) Patent No.: US 8,281,748 B2
(45) Date of Patent: Oct. 9, 2012

(54) DOUBLE LOOP AUTO-ADJUST PET RESTRAINT DEVICE

(75) Inventors: Cynthia M. Elkins, Ashland, WI (US); Thomas J. Gazdik, Jr., Iron River, WI (US)

(73) Assignee: Soft Lines, Inc, Ashland, WI (US)

( * ) Notice: Subject to any disclaimer, the term of this patent is extended or adjusted under 35 U.S.C. 154(b) by 145 days.

(21) Appl. No.: 12/925,625

(22) Filed: Oct. 25, 2010

(65) Prior Publication Data

US 2011/0083616 A1 Apr. 14, 2011

Related U.S. Application Data

(63) Continuation-in-part of application No. 12/231,225, filed on Aug. 29, 2008, now abandoned.

(51) Int. Cl.
*A01K 27/00* (2006.01)
(52) U.S. Cl. ........................................................ 119/792
(58) Field of Classification Search ................... 119/792, 119/793, 863, 795, 907
See application file for complete search history.

(56) References Cited

U.S. PATENT DOCUMENTS

| | | | | |
|---|---|---|---|---|
| 2,458,489 A | * | 1/1949 | Hallander | 119/793 |
| 2,614,533 A | * | 10/1952 | Elsinger | 119/864 |
| 4,924,815 A | * | 5/1990 | Halla | 119/864 |
| 5,317,989 A | * | 6/1994 | Swanson et al. | 119/792 |
| 5,647,303 A | * | 7/1997 | Deioma | 119/864 |
| 6,062,173 A | * | 5/2000 | Heinrichs | 119/770 |
| 6,213,057 B1 | * | 4/2001 | Franco et al. | 119/793 |
| 6,397,784 B1 | * | 6/2002 | Morgan-Albertson et al. | 119/792 |
| 6,481,384 B2 | * | 11/2002 | Jacobs | 119/864 |
| 6,595,156 B1 | * | 7/2003 | Curran | 119/792 |
| 6,708,650 B1 | * | 3/2004 | Yates | 119/792 |
| D495,450 S | * | 8/2004 | Ehrmann | D30/137 |
| 7,051,682 B2 | * | 5/2006 | Clute et al. | 119/864 |
| 7,165,511 B1 | * | 1/2007 | Brezinski | 119/792 |
| 2006/0081197 A1 | * | 4/2006 | Kuykendall | 119/792 |
| 2008/0105216 A1 | * | 5/2008 | Sporn | 119/863 |
| 2010/0043722 A1 | * | 2/2010 | Elkins et al. | 119/814 |

* cited by examiner

*Primary Examiner* — Kristen C Hayes

(57) ABSTRACT

At time it is necessary to restrain pets. Many pet restraining devices are uncomfortable for pets and some may injure pets. The Double loop auto-adjust pet restraining device applies a uniform pressure around the entire perimeter of the neck when a pet is retained in the neck area. A second loop of the Double loop auto-adjust pet restraining device can be utilized to restrain the body or torso of a pet, the device applies a uniform pressure around the entire perimeter of that body area. The Double loop auto-adjust pet restraining device uses a design that enables pets to be restrained in a very humane way.

18 Claims, 22 Drawing Sheets

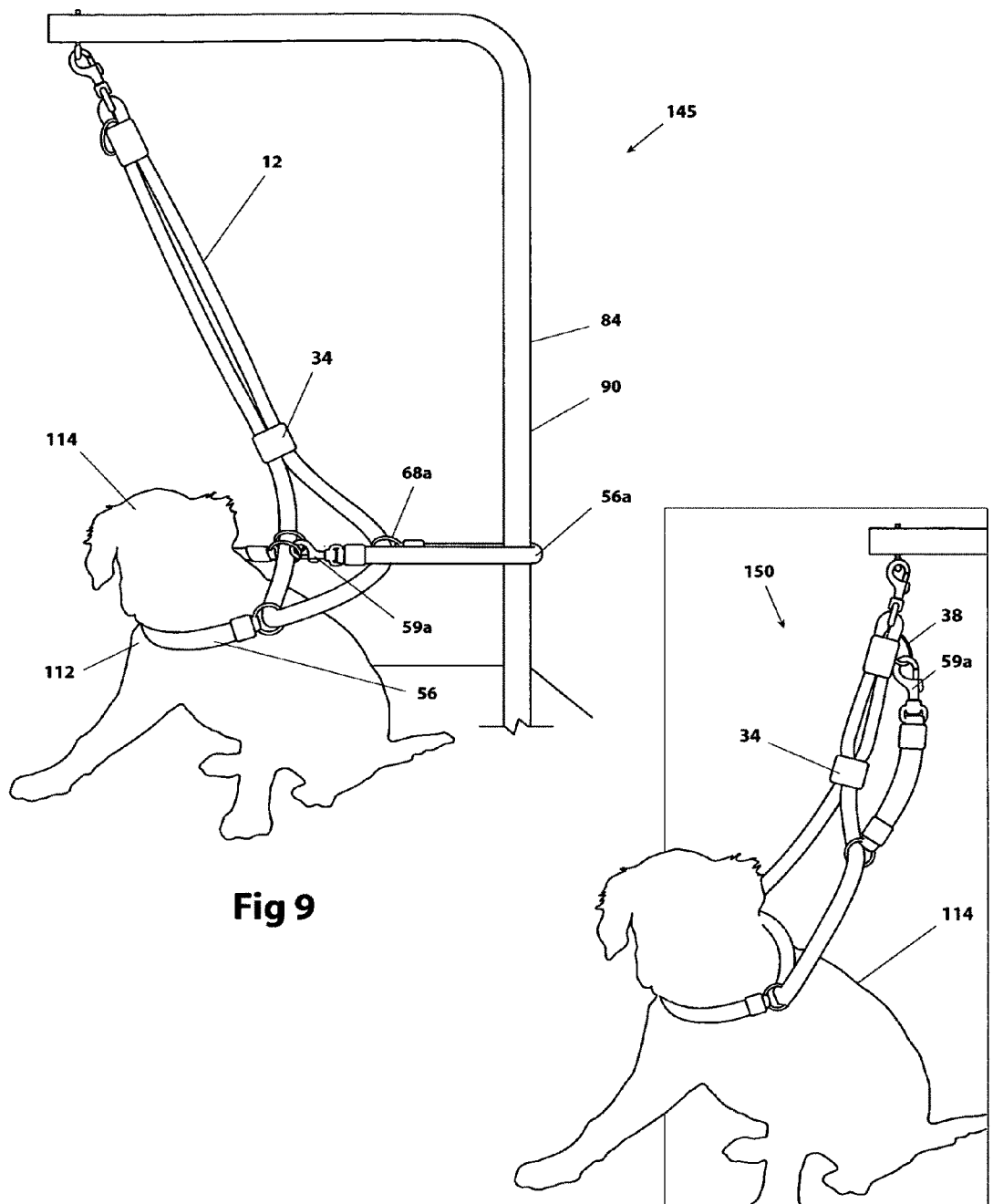

Webbing Sewing Steps And Label Sewing Steps
Step 1:
Webbing shown open with rope laying on top.
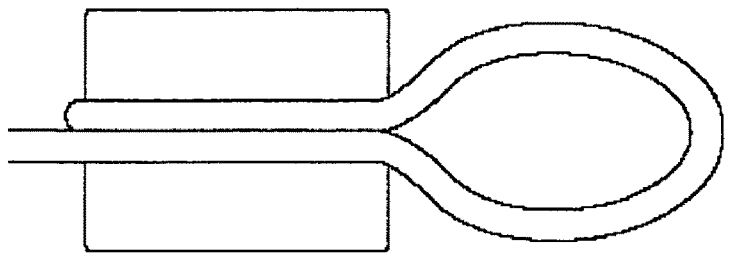
Step 2:
Webbing shown one side folded over.
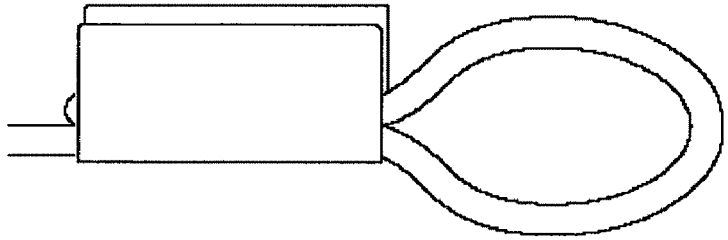
Step 3:
Webbing shown both sides folded over and sewn together.
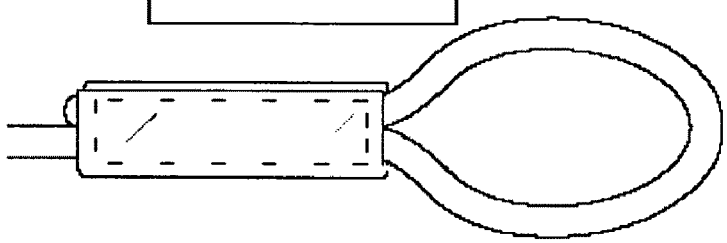
Step 4:
Webbing shown with a label sewn just in side of the webbing area with a custom label.
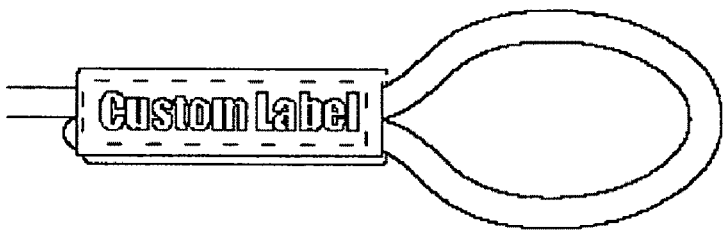
Fig 19A ns device.
DOUBLE LOOP AUTO-ADJUST PET RESTRAINT DEVICE This application is a continuation in part of application Ser. No. 12/231,225 now abandoned, filed on Aug. 29, 2008.

FIELD OF THE INVENTION

This invention relates generally to the field of pet restraint devices.

SUMMARY AND OBJECTS OF THE INVENTION

Often it is necessary to restrain pets while they are groomed, or bathed, or dried after bathing, or examined by a veterinarian, or while being exercised outdoors, or while being transported in a vehicle, etc. Many pet restraining devices are uncomfortable for pets and some may injure pets. The Double loop auto-adjust pet restraining device applies a uniform pressure around the entire perimeter of the neck when a pet is retained in the neck area. A second loop of the Double loop auto-adjust pet restraining device can be utilized to restrain the body or torso of a pet, the device applies a uniform pressure around the entire perimeter of that body area. The Double loop auto-adjust pet restraining device uses a design that enables pets to be restrained in a very humane way. The Double loop auto-adjust pet restraining device is self adjusting so as to accommodate many different sizes of pets. The Double loop auto-adjust pet restraining device can be modified many different ways and utilized many different ways.

BRIEF DESCRIPTION OF THE DRAWINGS

In order that the manner in which the above and other objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying annexed drawings wherein:

FIG. 9. Is a front view of a dog restrained by the new double loop auto-adjust restraining device. One strap is around the neck of the dog and the other strap is looped around the vertical section of a grooming arm.

FIG. 10. Is a side view of a dog restrained by the new double loop auto-adjust restraining device. One strap is around the neck of the dog and the other strap is not being utilized and is hooked to a ring.

FIG. 19A shows the steps involved in applying the webbing to a rope and applying a label to the new Double loop auto-adjust pet restraining device.

Figure 1:
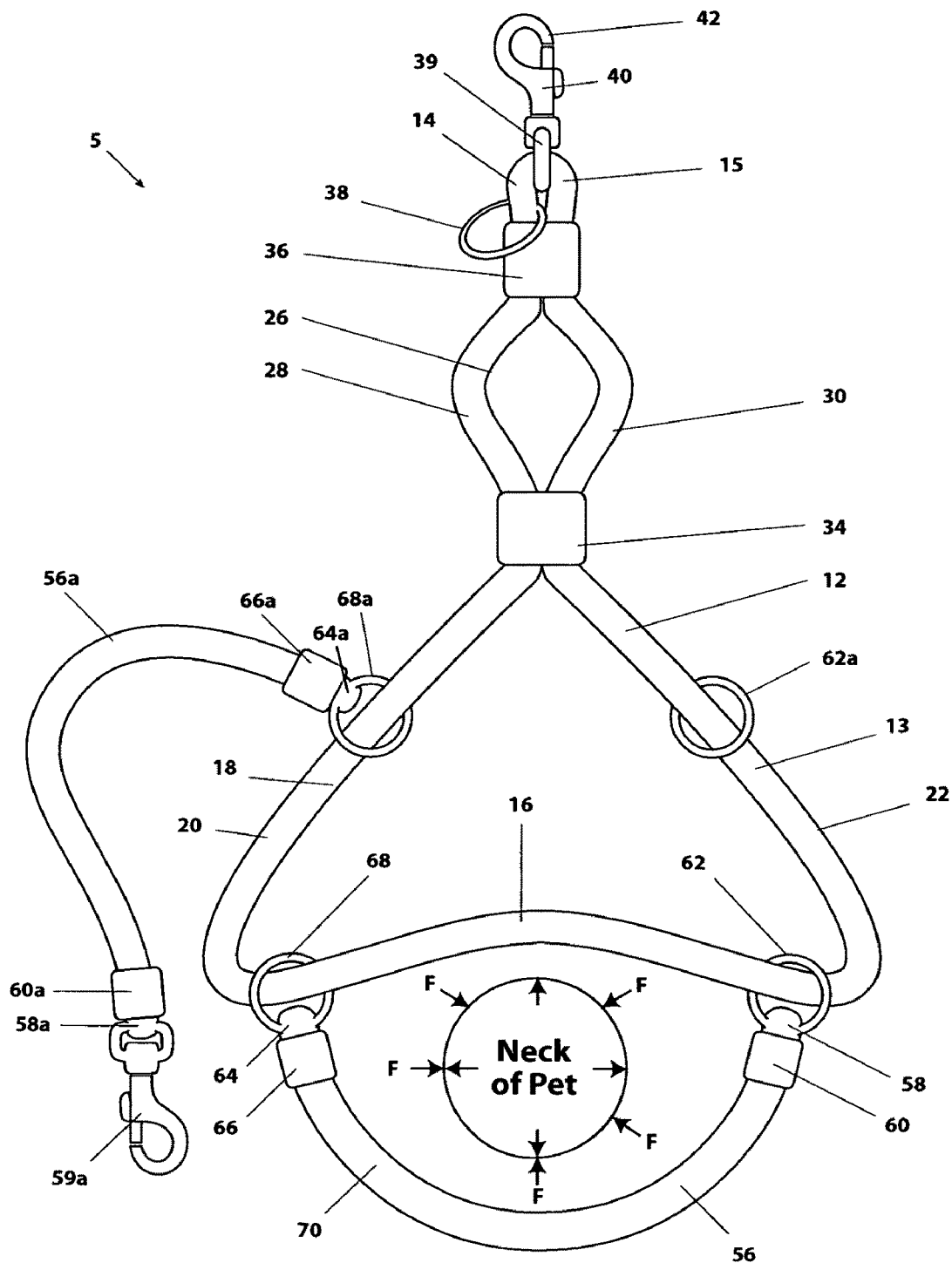
FIG. 1. Is a top view of the new double loop auto-adjust pet restraining device.

The objects and advantages of the invention will become apparent when the drawings are studied in conjunction with reading the following description and the claims.

DESCRIPTION OF THE PREFERRED EMBODIMENTS

In keeping with the requirements of Patent Laws there is described herein below the best mode of the invention that is currently known to the applicant. For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally, occur to one skilled in the art to which the invention relates.

With reference now to the drawings, and in particular, to FIGS. 1-19A thereof, the preferred embodiments of the new Double loop auto-adjust pet restraining device embodying the principles and concepts of the present invention and generally designated by the reference number 5 will be described.

In FIG. 1 shown generally at 5 is a top view of the new Double loop auto-adjust pet restraining device 12. The main loop 13 has a first end 14 and a second end 16. Main loop 13 has a first loop 18 that has first side 20 and a second side 22. Main loop 13 has a second loop 26 that has first side 28 and a second side 30. Sliding snugger 34 slides along main first loop 13 and forms first loop 18 and second loop 26. Rope retainer or webbing 36 fastens ends of rope and form a Lop loop 15. The webbing retainer is further described in FIG. 19A. Top loop 15 encircles ring 38 and hook loop 39 of hook 40. Hook 40 has end 42 that opens. Hook Strap 56 has a first end 58 that has fastening material or webbing 60 and ring 62. Strap 56 has second end 64 that has fastening material or webbing 66 and ring 68. A loop 70 is formed that restrains pet between end 16 of main loop 13 and strap 56. The circle inside loop 70 shows how the neck of a pet would be positioned inside loop 70. The arrows show how the restraining forces would be evenly distributed around the entire perimeter of the pets neck when loop 70 is tight.

Second strap 56a has a first end 58a that has fastening material or webbing 60a and hook 59a. Hook generally will be connected to ring 62a when pet is restrained. Second strap 56a has second end 64a that has fastening material or webbing 66a and ring 68a.

Double loop auto-adjust pet restraining devices can be made of a variety of sizes and of a variety of materials and optional designs.

Double loop auto-adjust pet restraining devices can be made of a variety of sizes such as small, medium, large, and extra large. Also an auto-adjust restraining device can be made in a custom size for a special application.

Double loop auto-adjust pet restraining devices can be made of a variety of material and combinations thereof. For example the flexible loops could be made of nylon, or polypropylene, or other plastic materials, or hemp, or leather, etc The flexible loops can have a round shape, or a flat shape, and could be made of different diameters and widths of nylon, or polypropylene, or other plastic materials, or hemp, or leather, etc. The flexible loops could be made of different colors and/or combination of colors.

The rings could be made of brass, or stainless steel, or plastic, or other materials. The rings could be round. Oval. Square shaped "D" shaped or other shapes.

Instead of a ring, a loop could be made of the same material as a strap.

The hook could be made of brass, or stainless steel, or plastic, or other materials.

The ends of the flexible loops could be fastened by different methods. Fastening material or webbing 36, 60, 66, 60a, 66a could be sewn, or riveted, or clamped or any combination thereof. Additionally, the fastening material could be made of a variety of different materials.

Different labels could be incorporated onto the device for different customers.

Figure 1A:
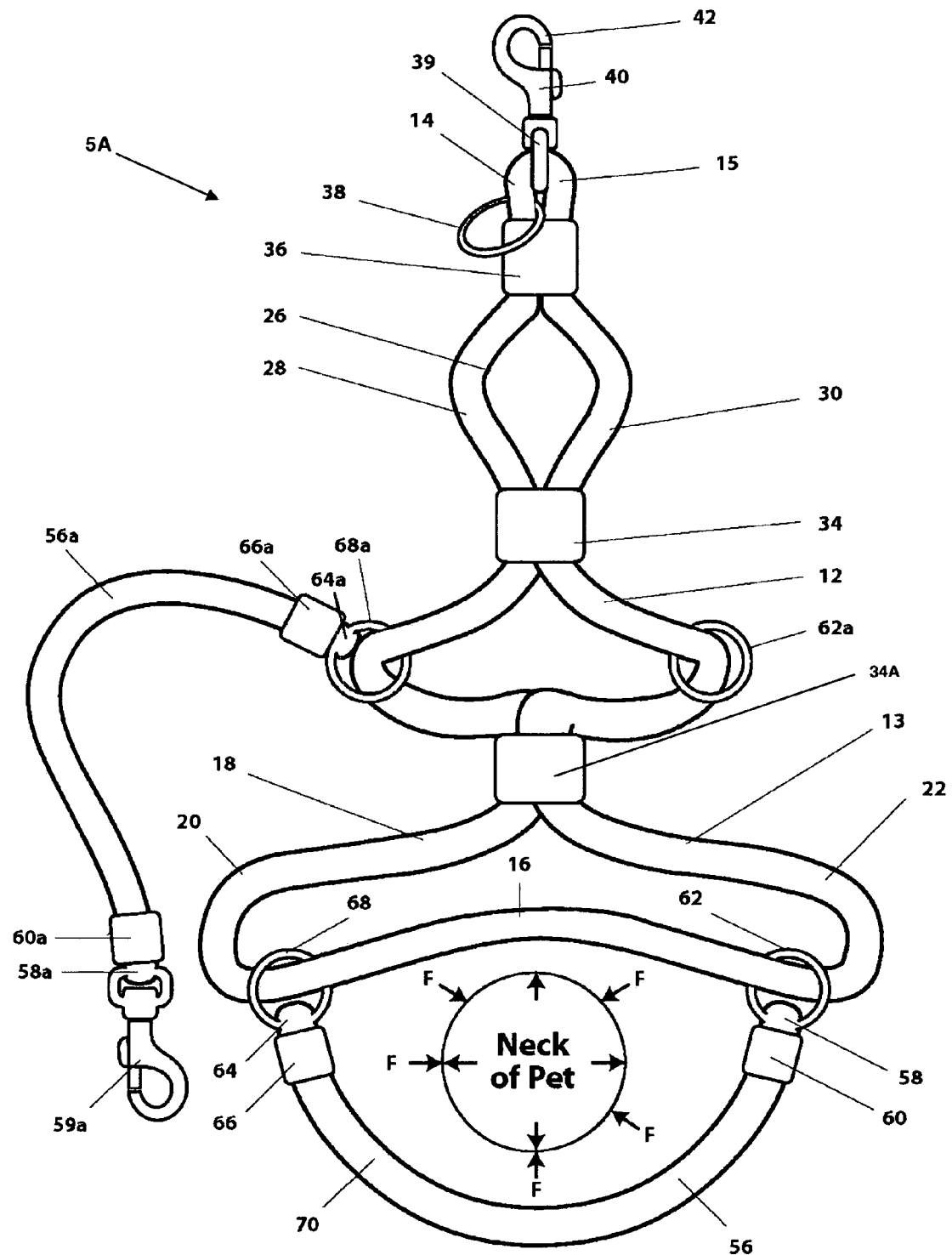
FIG. 1A. Is an alternate embodiment of the new double loop auto-adjust pet restraining device.

In FIG. 1A shown generally at 5A is a top view of an alternate embodiment of the new Double loop auto-adjust pet restraining device 12. This alternate embodiment is similar to the Double loop auto-adjust pet restraining device shown FIG. 1. This embodiment adds a second sliding snugger 34A. The second sliding snugger 34A is desirable in certain applications.

Figure 1B:
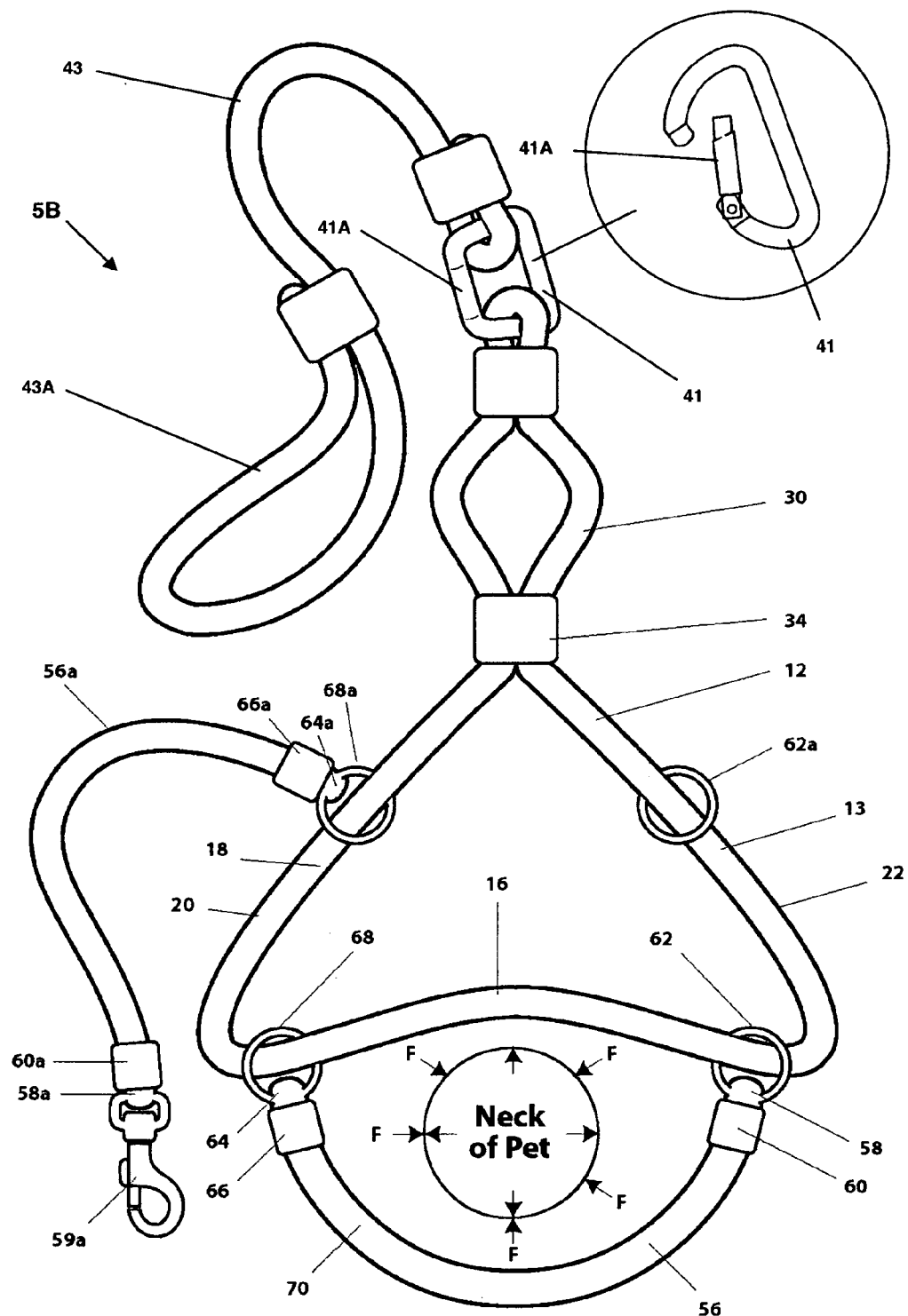
FIG. 1B. Is an another alternate embodiment of the new double loop auto-adjust pet restraining device. This embodiment is utilized as a leash.

In FIG. 1B shown generally at 5B is a top view of an alternate embodiment of the new Double loop auto-adjust pet restraining device 12. This alternate embodiment is similar to the Double loop auto-adjust pet restraining device shown FIG. 1. This embodiment has an aluminum coupling device 41 that has an open, close mechanism 41A. Leash section 43 is coupled to coupling device 41. Leash section 43 has loop 43A. This embodiment enables the Double loop auto-adjust pet restraining device to be utilized as a leash when taking a pet for walk.

Figure 1C:
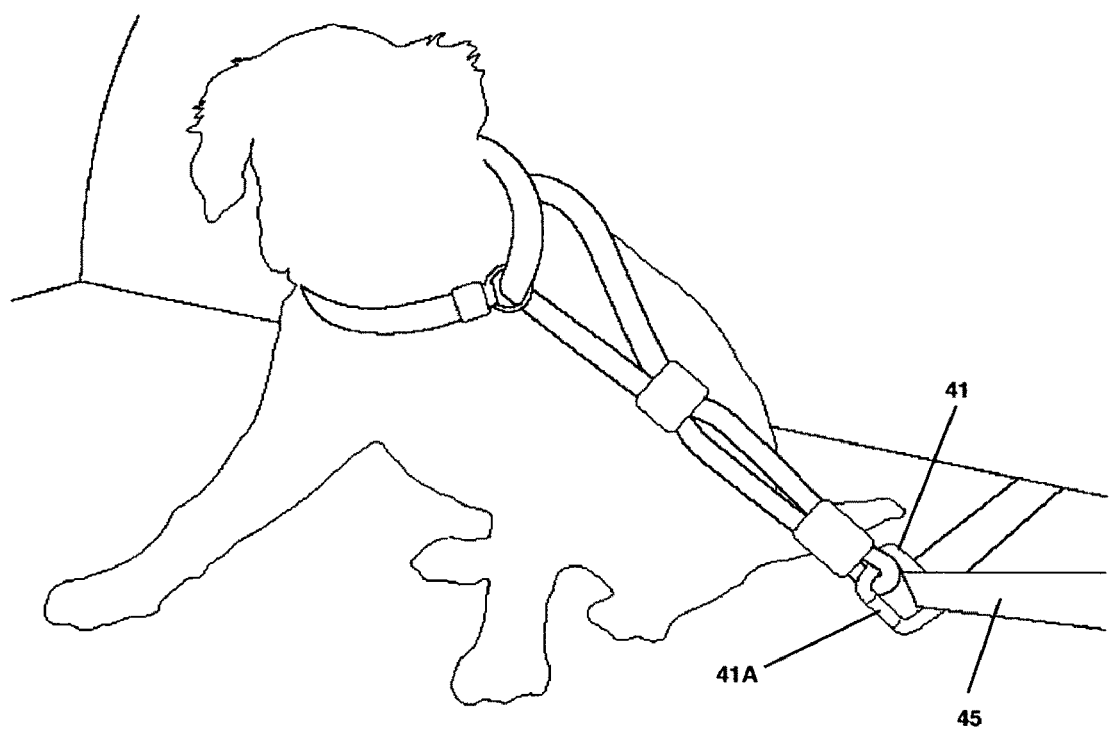
FIG. 1C. Is an another alternate embodiment of the new double loop auto-adjust pet restraining device. This embodiment is utilized as a safety restraining device in a vehicle.

In FIG. 1C shown generally at 5C is a view of an alternate embodiment of the new Double loop auto-adjust pet restraining device 12. This alternate embodiment is similar to the Double loop auto-adjust pet restraining device shown FIG. 1 and FIG. 1B. This embodiment has an aluminum coupling device 41 that has an open, close mechanism 41A. Coupling device has been fastened to a seat belt 45 in a vehicle. This embodiment enables the Double loop auto-adjust pet restraining device to be utilized as a safety device when a petis being transported in a vehicle.

Figure 1D:
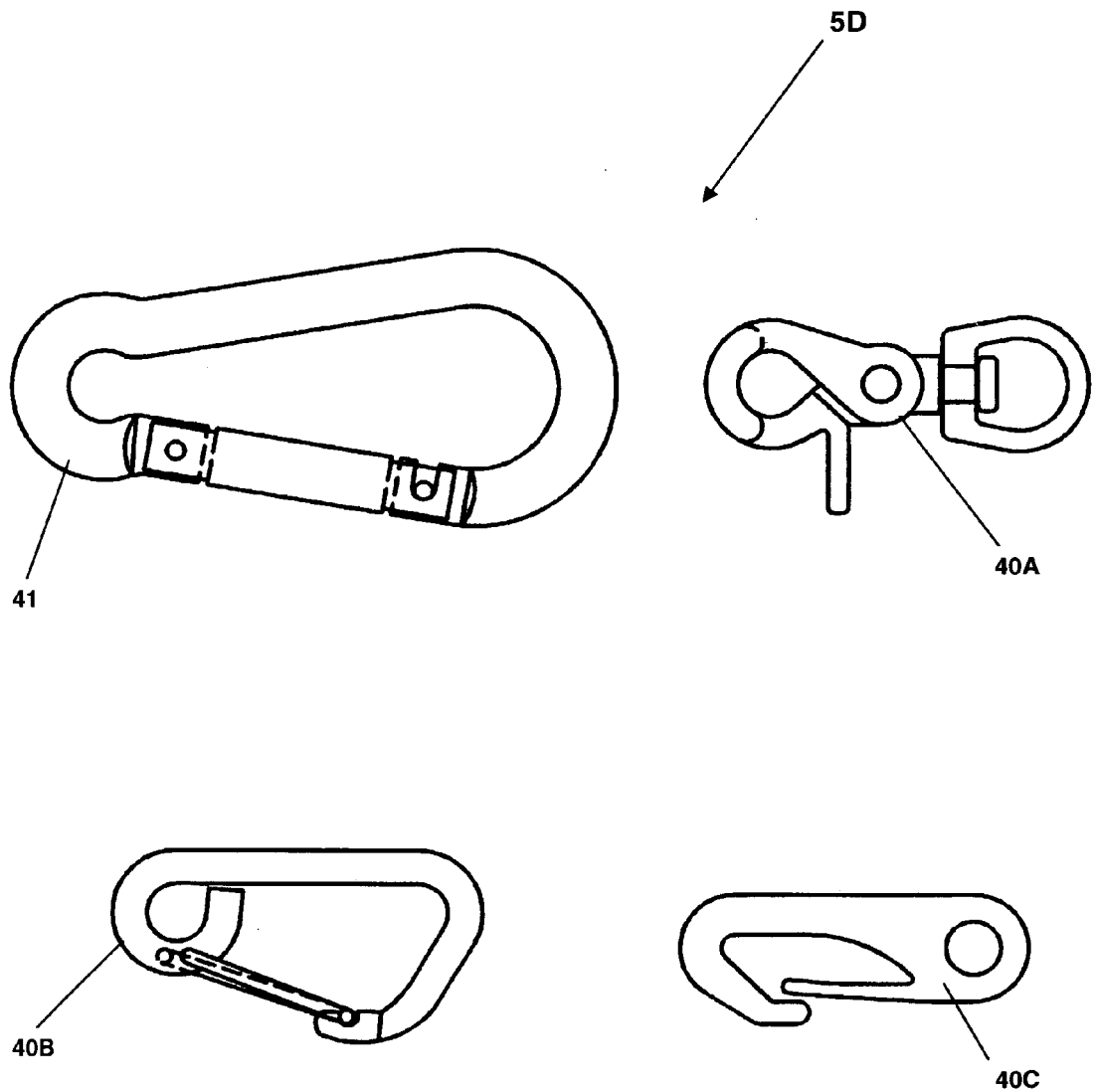
FIG. 1D. Shows alternate couplers or hooks that can be utilized on different double loop auto-adjust pet restraining devices.

In FIG. 1D shown generally at 5D are examples of couplers or hooks that can be utilized on different double loop auto-adjust pet restraining devices. All of the devices have an open and closed position. Some of the devices are hooks. The hooks have an open and closed position. The hooks in general have a normally closed position. Most of the hooks have some type of spring mechanism that keeps the hook in the normally closed position. Hook 40A is an alternate design that is often referred to as a scissors snap hook. Hook 40B is an alternate design that is often referred to as a spring snap hook. Hook 40C is an alternate design that is often referred to as a acetyl snap hook. Hook 41 is an alternate design that is often referred to as a spring hook and it is also known as a safety hook.

The couplers and hooks could be made of a variety of sizes and shapes and designs and materials. Some possibilities of materials include aluminum, anodized aluminum, copper, solid bronze, solid bronze with nickel plating, solid brass, and solid brass with nickel plating, and stainless steel, etc. Other materials might include steel, galvanized steel, steel with nickel plating, steel with bronze plating, steel with chrome plating. Other metals include malleable iron, malleable iron with bronze plating, malleable iron with nickel plating, and malleable iron with chrome plating, etc. Also a wide variety of plastic materials could be utilized such as nylon, nylon composites, plastic composites, and delron plastics, etc.

Figure 1E:
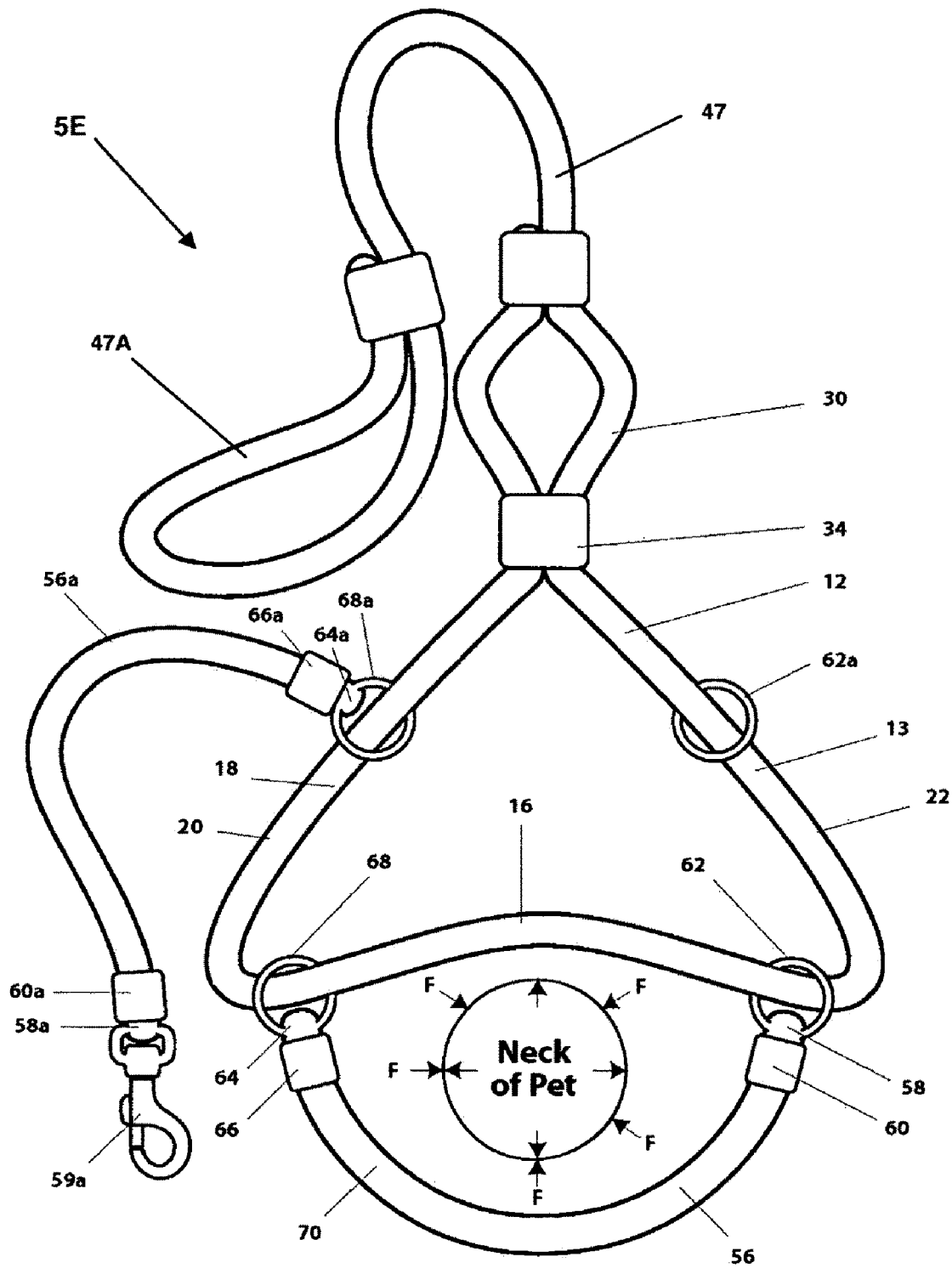
FIG. 1E. Is an another alternate embodiment of the new double loop auto-adjust pet restraining device. This embodiment is utilized as a leash.

In FIG. 1E shown generally at 5E is a top view of an alternate embodiment of the new Double loop auto-adjust pet restraining device 12. This alternate embodiment is similar to the Double loop auto-adjust pet restraining device shown FIG. 1. This embodiment has a Leash section 47. Leash section 47 has loop 47A. This embodiment enables the Double loop auto-adjust pet restraining device to be utilized as a leash when taking a pet for walk. Leash and loop can be one continuous piece, or separate pieces that are sewn together in a webbing.

Figure 2:
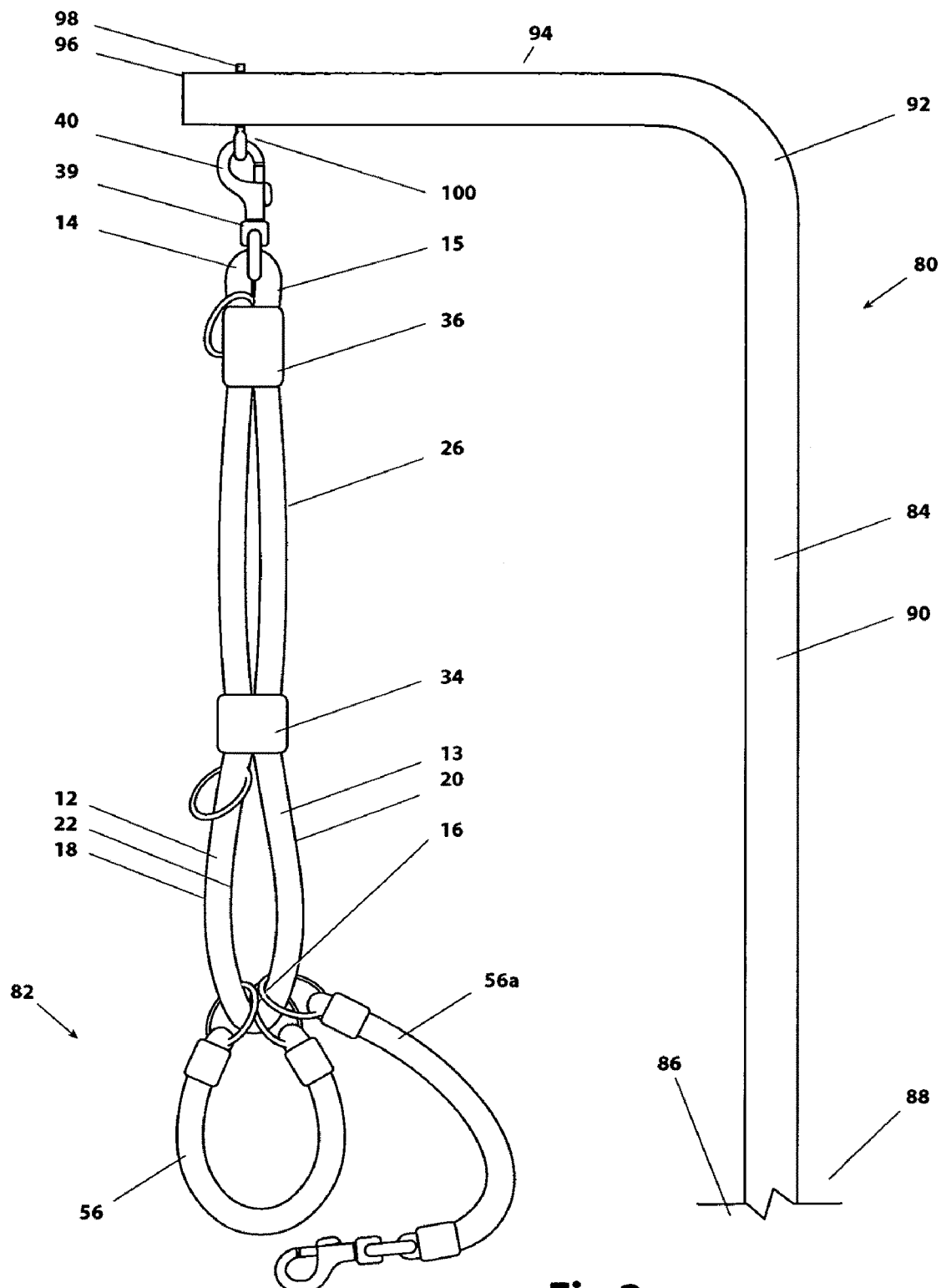
FIG. 2. Is a front view of the new double loop auto-adjust pet restraining device hanging from a grooming arm.

In FIG. 2. Shown generally at 80 is a front view of the Double loop auto-adjust pet restraining device 12 hanging from a grooming arm 94. The main loop 13 has a first end 14 and a second end 16. Main loop 13 has a bottom loop 18 that has first side 20 and a second side 22. Sliding snugger 34 slides along main loop 13 and forms bottom loop 18 and top loop 26. Rope retainer 36 fastens ends of rope and form a fastening loop 15. Fastening loop 15 encircles ring 38 and hook loop 39 of hook 40. Strap 56 has a first end ring 62. Double loop auto-adjust pet restraining device 12 has a first strap 56 and a second strap 56a. Surface of grooming table 82 is where a pet would be positioned. Grooming arm 84 has a clamping device 86 at the base 88 where the grooming arm 84 is fastened to grooming table 82. Grooming arm 84 has a vertical section 90 a curved section 92 and a horizontal section 94. Grooming arm terminates in end 96 and has bolt 98 that has a loop 100 that hook 40 of the auto-adjust grooming device 13 can be fastened thereto.

Figure 3:
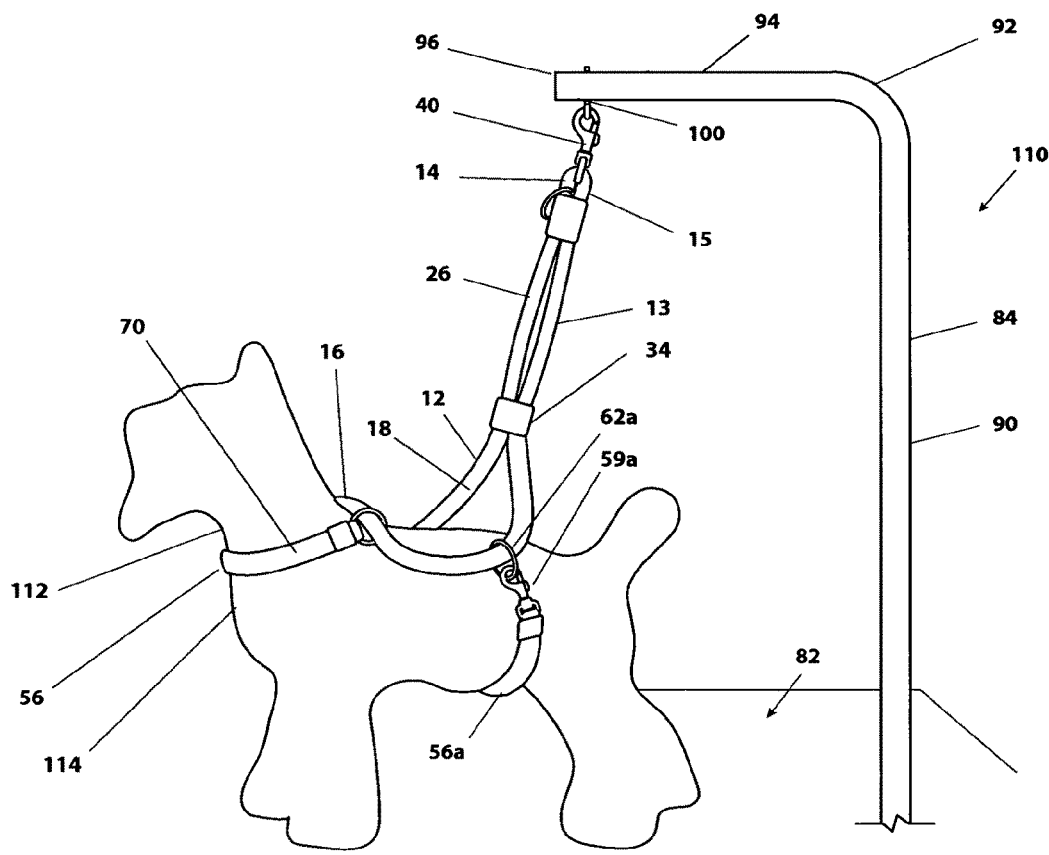
FIG. 3. Is a side view of the new double loop auto-adjust pet restraining device hanging from a grooming arm. A dog is on top of a grooming table and is restrained by the new double loop auto-adjust restraining pet device.

Shown generally at 110 in FIG. 3 is a side view of the Double loop auto-adjust pet restraining device 12 hanging from a grooming arm 94 with a dog 114 is being restrained by the auto-adjust restraining device. The main loop 13 has a first end 14 and a second end 16. Main loop 13 has a bottom loop 18. Main loop 13 has a top loop 26. Sliding snugger 34 slides along main first loop 13 and forms bottom loop 18 and top loop 26. Fastening loop 15 encircles ring 38 and hook loop 39 of hook 40. Strap 56 is positioned around neck 112 of dog 114. First strap 56 has a ring 62 and ring 68. A loop 70 is formed that restrains pet between end 16 of main loop 13 and strap 56. Strap 56 is positioned around neck 112 of dog 114. Second strap 56a has a hook 59a and ring 68a. Second strap 56a of double loop pet restraining device 12 restrains rear portion of dog 114. Dog 114 is positioned on surface of grooming table 82. Grooming arm 84 has a vertical section 90 a curved section 92 and a horizontal section 94. Grooming arm terminates in end 96 and has bolt 98 that has a loop 100 that hook 40 of the Double loop auto-adjust grooming device 13 is hooked thereto.

Figure 4:
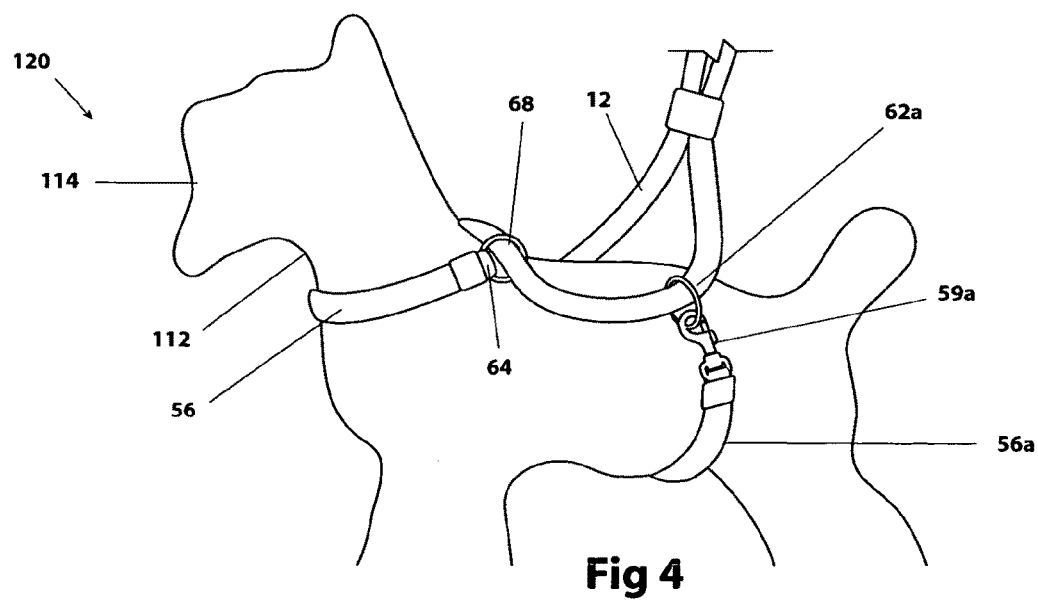
FIG. 4. Is a close up side view of a dog restrained by the new double loop auto-adjust restraining device.

Shown generally at 120 in FIG. 4. is a close up side view of a dog 114 restrained by the double loop auto-adjust restraining device 12. First strap 56 has a first end 58 (not seen) that has ring 62. First strap 56 has second end 64 that has ring 68. First strap 56 is positioned around neck 112 of dog 114. Second strap 56a has a hook 59a and ring 68a (not seen). Second strap 56a of double loop pet restraining device 12 restrains rear portion of dog 114.

Figure 4A:
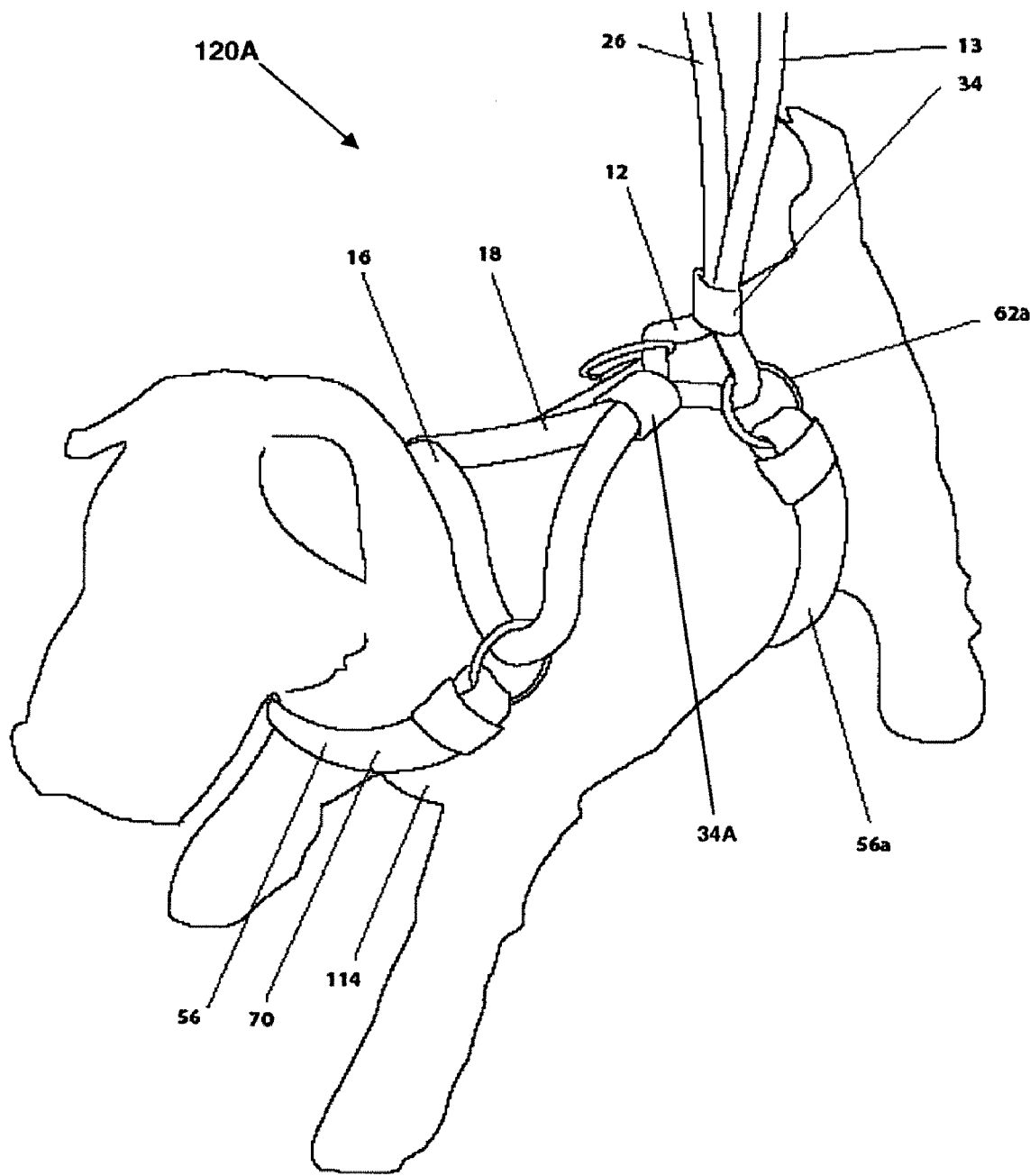
FIG. 4A. Is a close up side view of a dog restrained by the new double loop auto-adjust restraining device. This is the alternate embodiment of the new double loop auto-adjust pet restraining device shown in FIG. 1A.

Shown generally at 120A in FIG. 4A is a view of a dog 114 restrained by the double loop auto-adjust restraining device 12.

This embodiment has second sliding snugger 34A. A second sliding snugger 34A is desirable in various applications.

Figure 5:
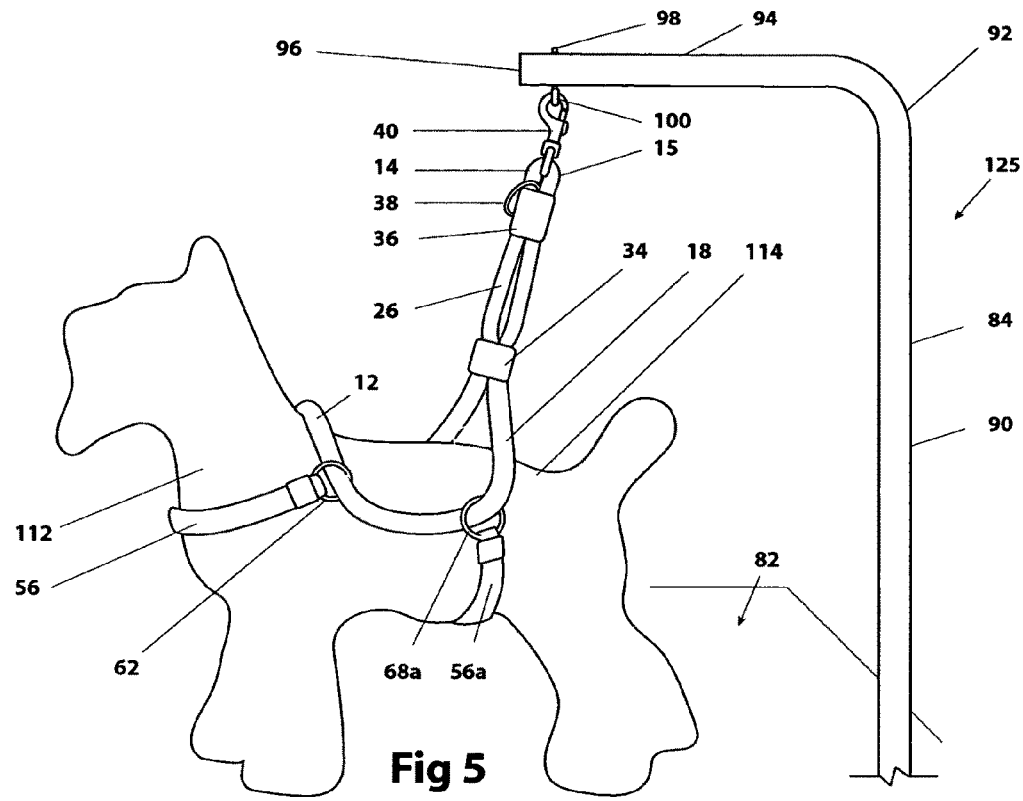
FIG. 5. Is a side view of a dog restrained by the new double loop auto-adjust restraining device.

Shown generally at 125 in FIG. 5 is a side view of the Double loop auto-adjust pet restraining device 12 hanging from a grooming arm 84 with a dog 114 is being restrained by the auto-adjust restraining device. This view is the opposite side of the dog that is shown in FIG. 3. The main loop 13 has a first end 14 and a second end 16. Main loop 13 has a bottom loop 18. Main loop 13 has a top loop 26. Sliding snugger 34 slides along main first loop 13 and forms bottom loop 18 and top loop 26. Fastening loop 15 encircles ring 38 and hook loop 39 of hook 40. First strap 56 is positioned around neck 112 of dog 114. First strap 56 has a ring 62 and ring 68. A loop 70 is formed that restrains pet between end 16 of main loop 13 and strap 56. First strap 56 is positioned around neck 112 of dog 114. Second strap 56a has a hook 59a and ring 68a. Second strap 56a of double loop pet restraining device 12 restrains rear portion of dog 114. Dog 114 is positioned on surface of grooming table 82. Grooming arm 84 has a vertical section 90 a curved section 92 and a horizontal section 94. Grooming arm terminates in end 96 and has bolt 98 that has a loop 100 that hook 40 of the Double loop auto-adjust grooming device 13 is hooked thereto.

Figure 6:
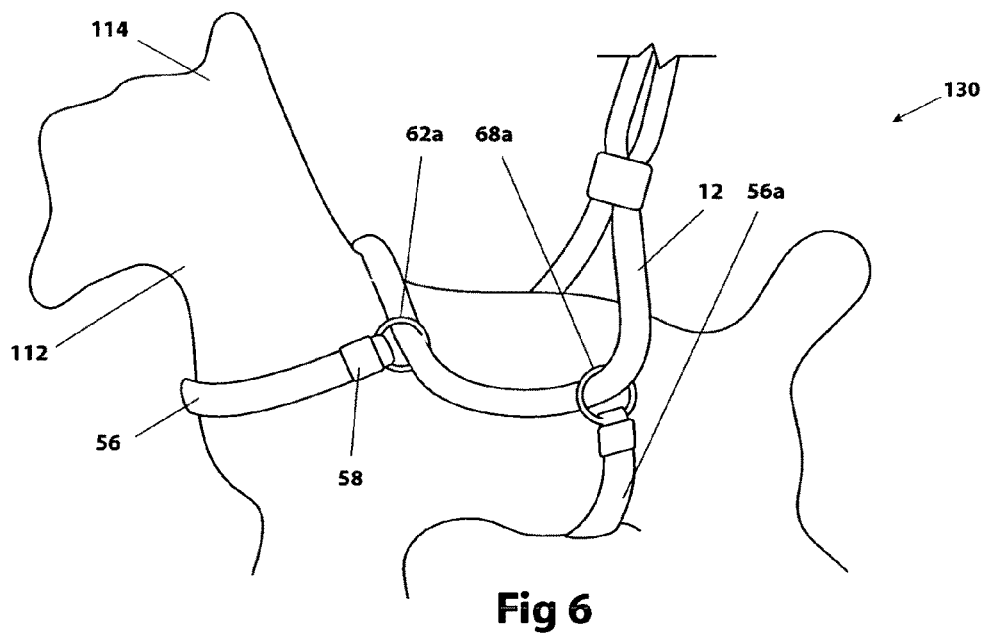
FIG. 6. Is a side view of a dog restrained by the new double loop auto-adjust restraining device.

Shown generally at 130 in FIG. 6. is a close up side view of a dog 114 restrained by the double loop auto-adjust restraining device 12. This is the opposite side of the dog from FIG. 4. First strap 56 has a first end 58 that has ring 62. First strap 56 has second end 64 that has ring 68 (not seen). First strap 56 is positioned around neck 112 of dog 114. Second strap 56a has a hook 59a (not seen) and ring 68a. Second strap 56a of double loop pet restraining device 12 restrains rear portion of dog 114.

Sliding snugger 34 slides along main first loop. A loop 70 is formed that restrains neck 112 of dog 114 between end 16 of main loop 13 and strap 56.

Figure 7:
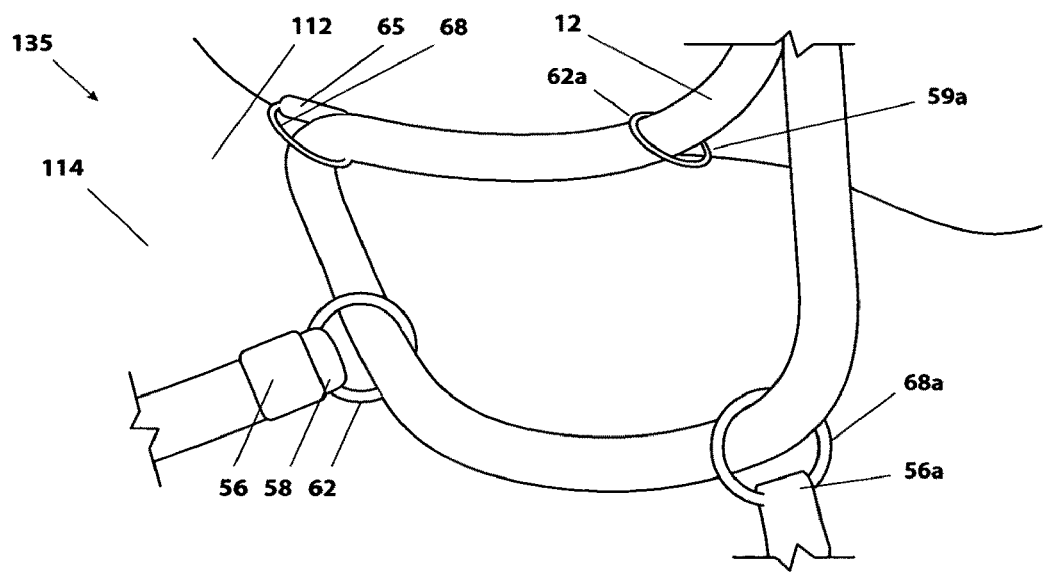
FIG. 7. Is a close up top view of a dog restrained by the new double loop auto-adjust restraining device.

Shown generally at 135 in FIG. 7. is a close up top view of a dog 114 restrained by the double loop auto-adjust restraining device 12. This is the opposite side of the dog from FIG. 4. First strap 56 has a first end 58 that has ring 62. First strap 56 has second end 64 that has ring 68 (not seen). First strap 56 is positioned around neck 112 of dog 114. Second strap 56a has a hook 59a (not seen) and ring 68a. Second strap 56a of double loop pet restraining device 12 restrains rear portion of dog 114.

Figure 8:
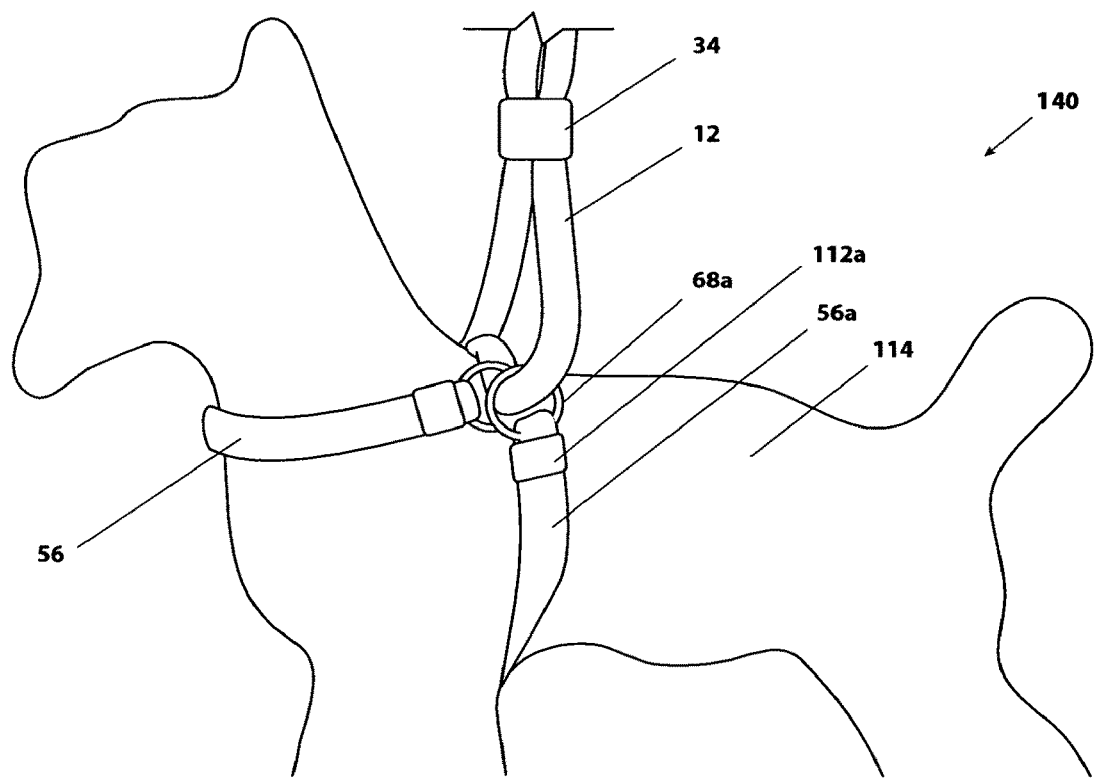
FIG. 8. Is a close up side view of a dog restrained by the new double loop auto-adjust restraining device. One strap is around the neck of the dog and the other strap is under the front legs of the dog.

Shown generally at 140 in FIG. 8. is a side view of a dog 114 restrained by the double loop auto-adjust restraining device 12. This is the same side of the dog as FIGS. 6 and 7. First strap 56 has a first end 58 that has ring 62. First strap 56 is positioned around neck 112 of dog 114. Second strap 56a has a hook 59a (not seen) and ring 68a. Second strap 56a of double loop pet restraining device 12 is positioned around chest 112a of dog 114. Sliding snugger 34 slides along main first loop.

Shown generally at 145 in FIG. 9. is a front view of a dog 114 restrained by the double loop auto-adjust restraining device 12. This shows an alternate way that the double loop auto-adjust restraining device 12 can be utilized to restrain a pet. First strap 56 is positioned around neck 112 of dog 114. Second strap 56a has a hook 59a and ring 68a. Second strap 56a of double loop pet restraining device 12 is looped around the vertical section 90 of Grooming arm 84. Sliding snugger 34 slides along main first loop.

Shown generally at 150 in FIG. 10. is a side view of a dog 114 restrained by the double loop auto-adjust restraining device 12. First strap 56 has a first end 58 that has ring 62. First strap 56 is positioned around neck 112 of dog 114. Second strap 56a has a hook 59a that is fastened to ring 38. Second strap 56a of double loop pet restraining device 12 is not being utilized to restrain dog 114 in this application. Sliding snugger 34 slides along main first loop.

Figure 11:
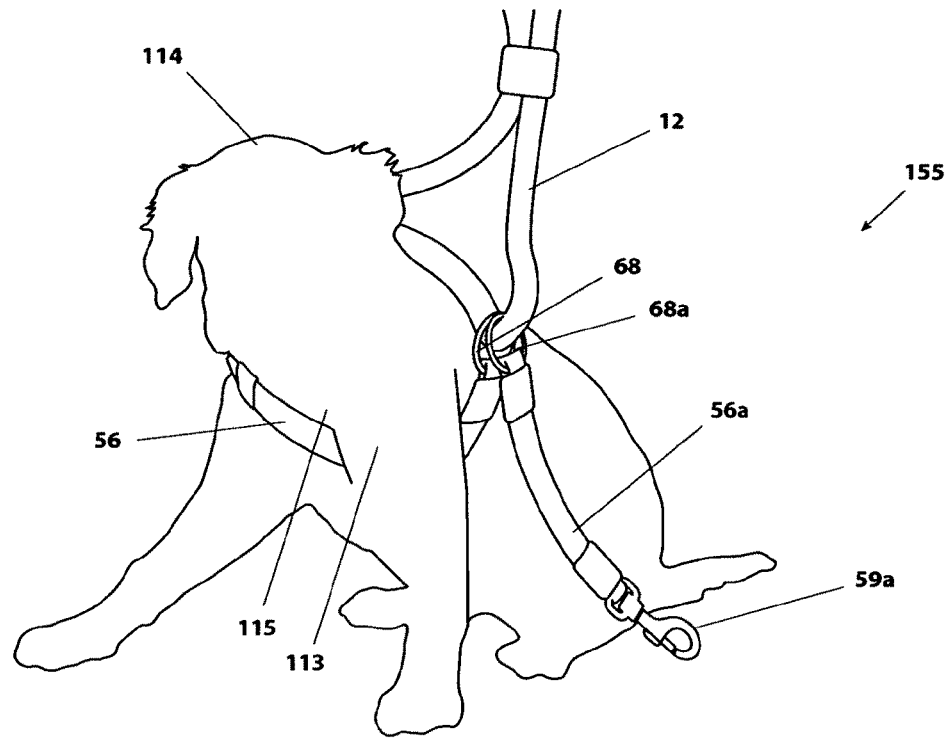
FIG. 11. Is a front view of a dog restrained by the new double loop auto-adjust restraining device. One strap is positioned across the chest and under a front leg of the dog.

Shown generally at 155 in FIG. 11 is a close up front view of a dog 114 restrained by the double loop auto-adjust restraining device 12. This shows how the double loop auto-adjust restraining device 12 can restrain a pet in a different way. The double loop auto-adjust restraining device 12 has the first strap 56 has a first end 58 that has ring 62. First strap 56 has second end 64 that has ring 68. First strap 56 is positioned under a first front leg 113 and across chest 115 of dog 114. Second strap 56a has a hook 59a and ring 68a. Second strap 56a of double loop pet restraining device 12 dangles free and is not utilized.

Figure 12:
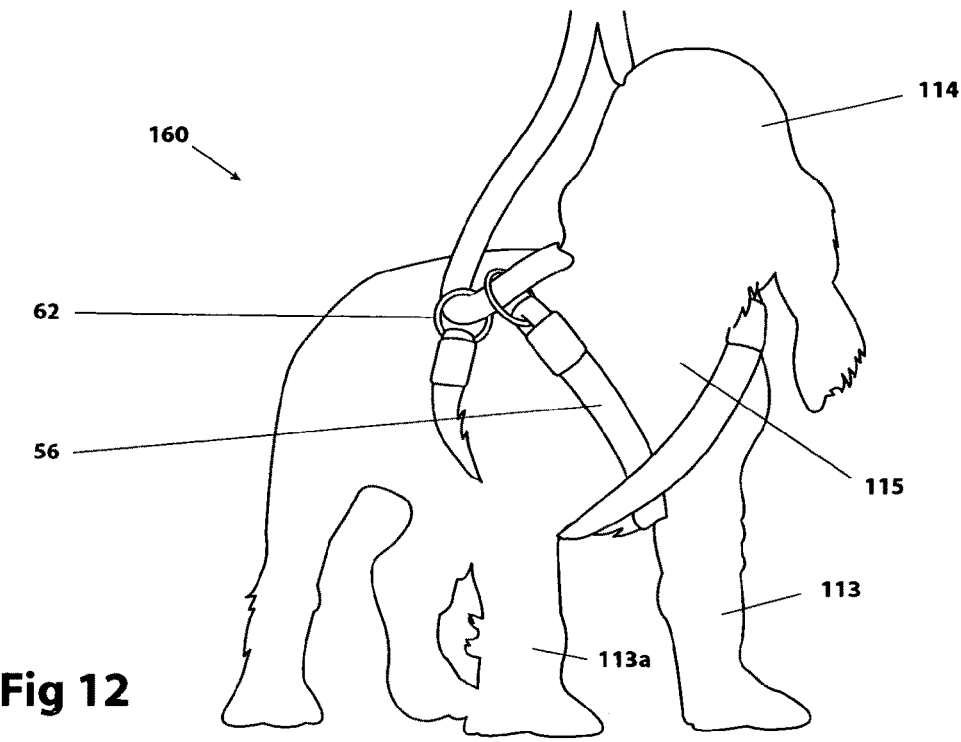
FIG. 12. Is a front view of a dog restrained by the new double loop auto-adjust restraining device. One strap is positioned across the chest and under a front leg of the dog. The other strap is positioned across the chest and under the other front leg of the dog.

Shown generally at 160 in FIG. 12 is a front view of a dog 114 restrained by the double loop auto-adjust restraining device 12. This shows how the double loop auto-adjust restraining device 12 can restrain a pet in a different way. The double loop auto-adjust restraining device 12 has the first strap 56 has a first end 58 that has ring 62. First strap 56 has second end 64 that has ring 68 (not seen). First strap 56 is positioned under a first front leg 113 and across chest 115 of dog 114. Second strap 56a has a hook 59a and ring 68a. Second strap 56a is positioned under a second front leg 113a and across chest 115 of dog 114.

Figure 13:
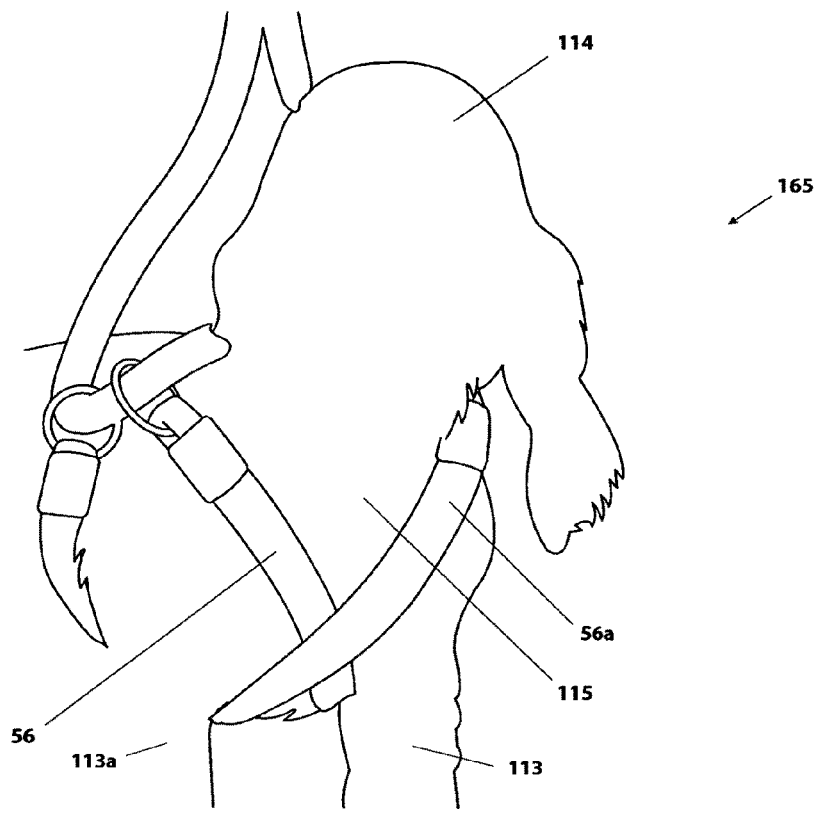
FIG. 13. Is a front view of a dog restrained by the new double loop auto-adjust restraining device. One strap is positioned across the chest and under a front leg of the dog. The other strap is positioned across the chest and under the other front leg of the dog.

Shown generally at 165 in FIG. 13 is a close up front view of a dog 114 restrained by the double loop auto-adjust restraining device 12. This shows how the double loop auto-adjust restraining device 12 can restrain a pet in a different way. This close up view to that shown in FIG. 12. The double loop auto-adjust restraining device 12 has the first strap 56 has a first end 58 that has ring 62. First strap 56 has second end 64 that has ring 68 not seen). First strap 56 is positioned under a first front leg 113 and across chest 115 of dog 114. Second strap 56a has a hook 59a and ring 68a. Second strap 56a is positioned under a second front leg 113a and across chest 115 of dog 114.

Figure 14:
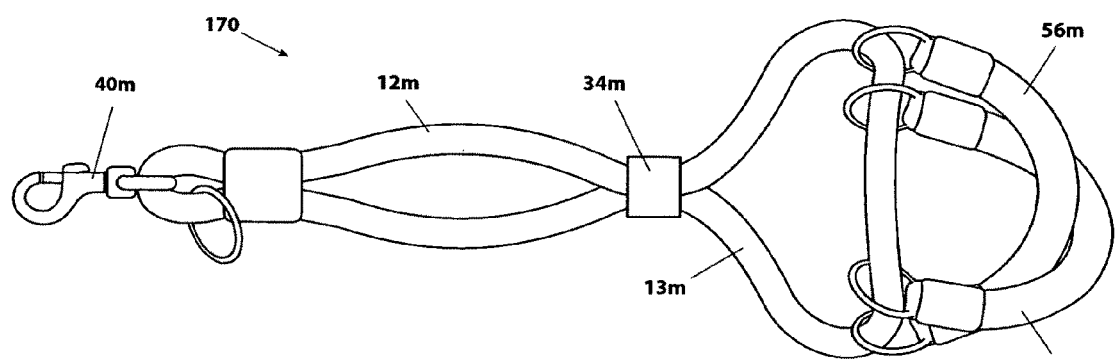
FIG. 14 is an alternate embodiment of the new Double loop auto-adjust pet restraining device. The second strap crosses over first strap.

In FIG. 14 shown generally at 170 is a top view of an alternate embodiment of the new Double loop auto-adjust pet restraining device 12m. Sliding snugger 34m slides along main first loop 13m that has hook 40m. First strap 56m has a first end that has a ring and second end that has a ring. Second strap 56n has a first end that has a ring and second end that has a ring. Second strap 56n crosses over first strap 56m.

Figure 14A:
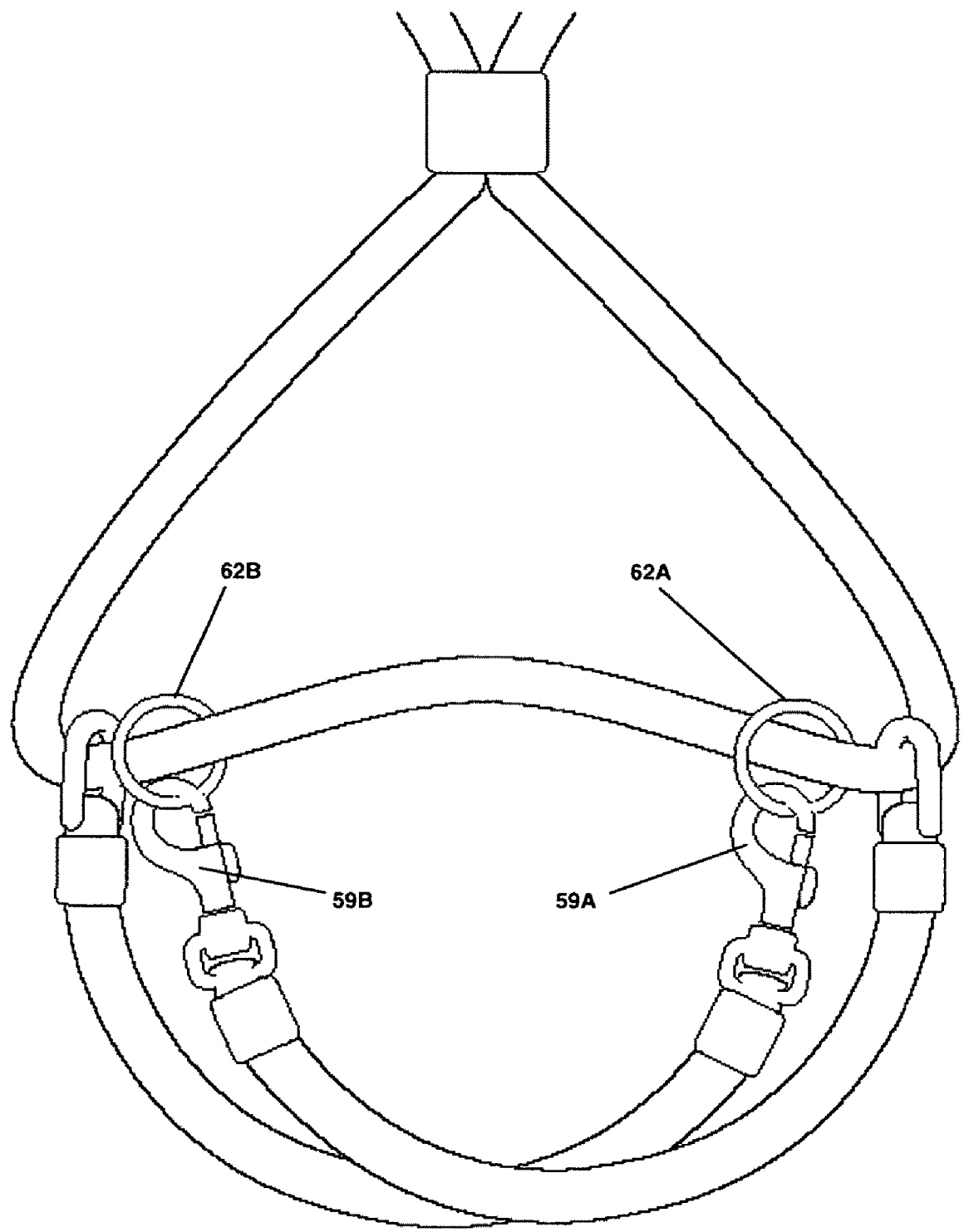
FIG. 14A is an alternate embodiment of the new Double loop auto-adjust pet restraining device. The second strap crosses over first strap. Both straps have a hook device.

In FIG. 14A shown generally at 170A is a top view of an alternate embodiment of the new Double loop auto-adjust pet restraining device 12m. This similar to the Double loop auto-adjust pet restraining device shown in FIG. 14. First strap has a first end that has a ring and second end that has hook 59A that is fastened to ring 62A. Second strap has a first end that has a ring and second end hook 59B that is fastened to ring 62B. Second strap crosses over first strap.

Figure 15:
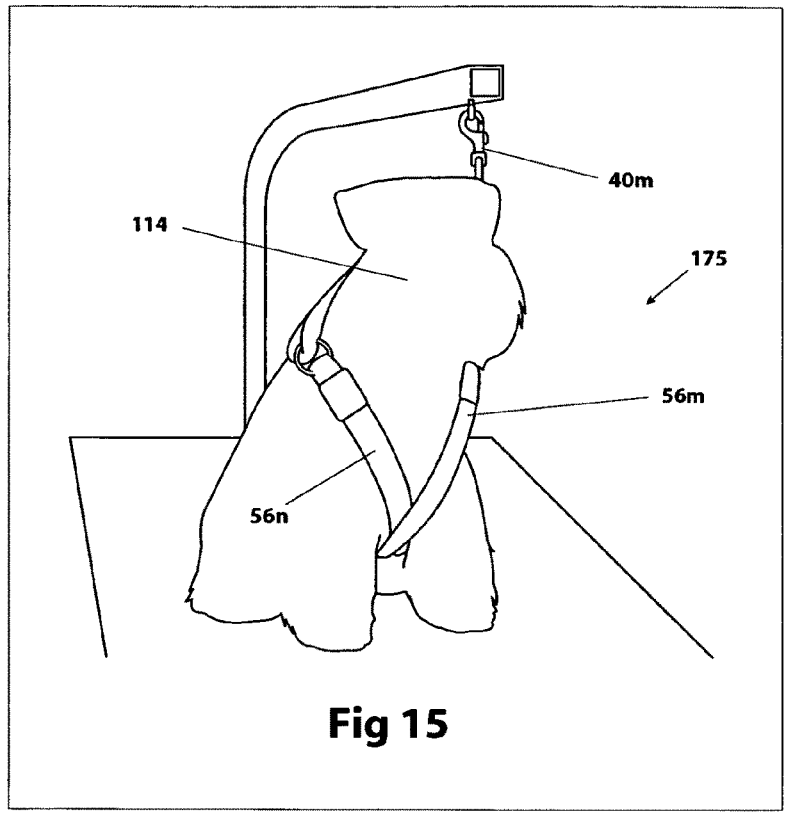
FIG. 15 is a front view of a dog being restrained by the alternate embodiment of the new Double loop auto-adjust pet restraining device shown in FIG. 14. The second strap crosses over first strap.

In FIG. 15 shown generally at 175 is a front view of the alternate embodiment of the new Double loop auto-adjust pet restraining device 12m restraining dog 114. First strap 56m has a first end that has a ring and second end that has a ring. Second strap 56n has a first end that has a ring and second end that has a ring. Second strap 56n crosses over first strap 56m across the chest of the dog. This is similar to the way the dog is restrained in FIG. 13.

Figure 16:
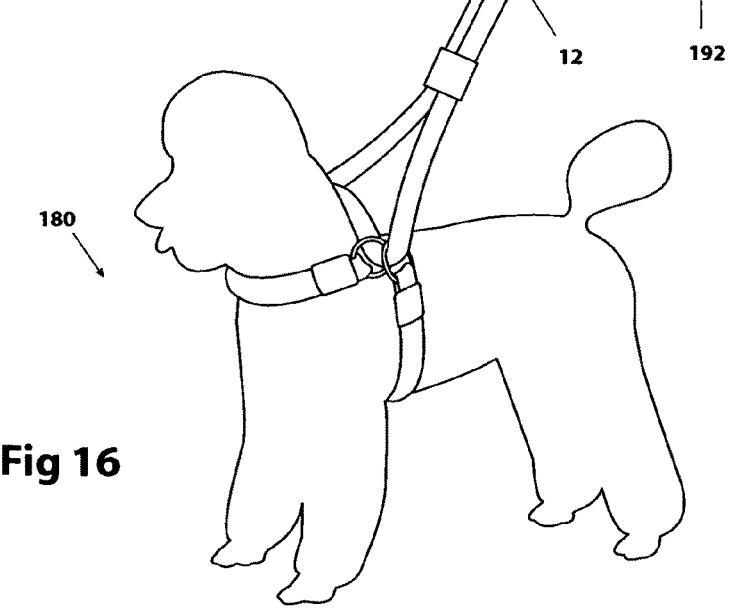
FIG. 16. Is a front view of a dog restrained by the double loop auto-adjust pet restraining device. This shows how a loop on the multi-use restraining device can fit a hand so that the double loop auto-adjust restraining device can be utilized as a leash.

Shown generally at 180 in FIG. 16 is a front view of a dog restrained by the double loop auto-adjust pet restraining device 12. This shows how the top loop 26 on the double loop auto-adjust restraining device 12 can fit a hand 192 so that the double loop auto-adjust restraining device can be utilized as a leash. Auto-adjust pet restraining device 12 is substantially the same auto-adjust pet restraining device 12 discussed in FIG. 1.

Figure 17:
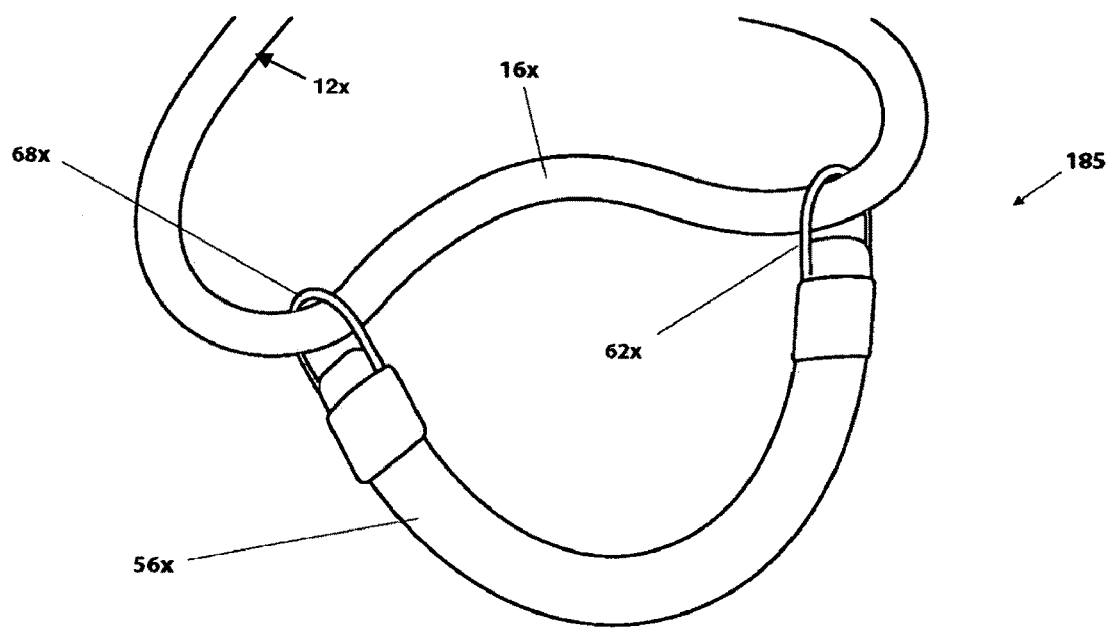
FIG. 17 is a top view of an alternate embodiment of the new Double loop auto-adjust pet restraining device. The strap ends have "D" shaped rings.

In FIG. 17 shown generally at 185 is a top view of an alternate embodiment of the new Double loop auto-adjust pet restraining device 12x. First strap 56x has a first end that has a "D" shaped ring 62x and second end that has a "D" shaped ring 68x.

Figure 18:
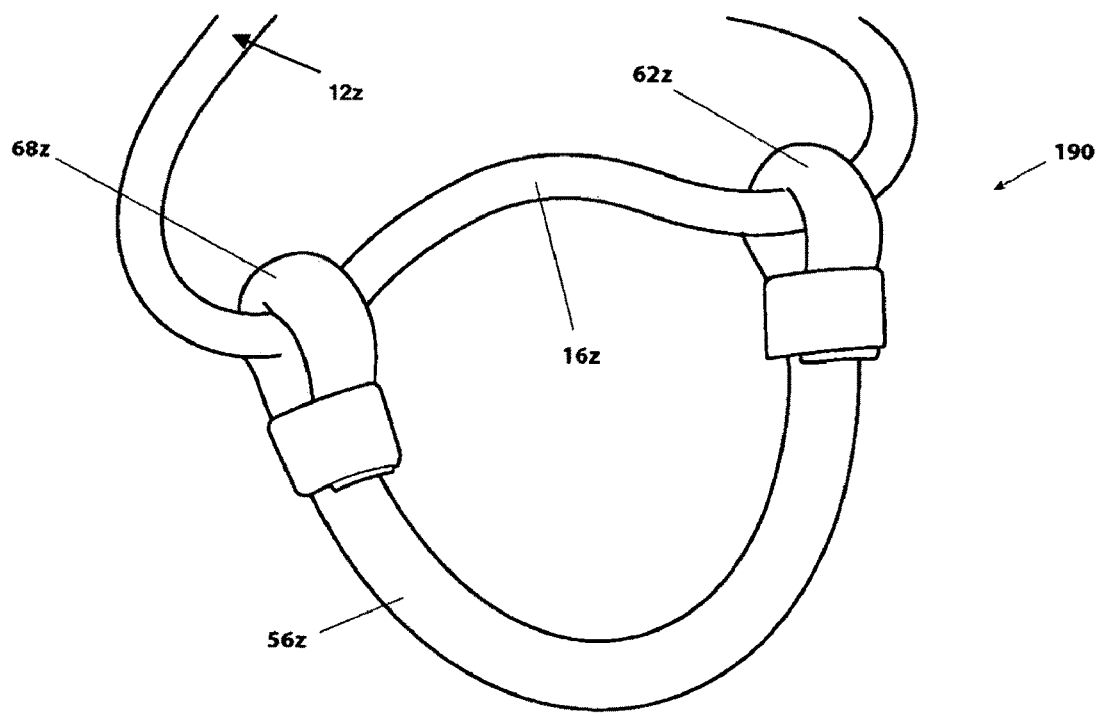
FIG. 18 is a top view of an alternate embodiment of the new Double loop auto-adjust pet restraining device 1. The straps have loops that are formed from the same material as the straps.

In FIG. 18 shown generally at 190 is a top view of an alternate embodiment of the new Double loop auto-adjust pet restraining device 12z. First strap 56z has a first end that has a loop 62z and second end that has a loop 68z.

Figure 19:
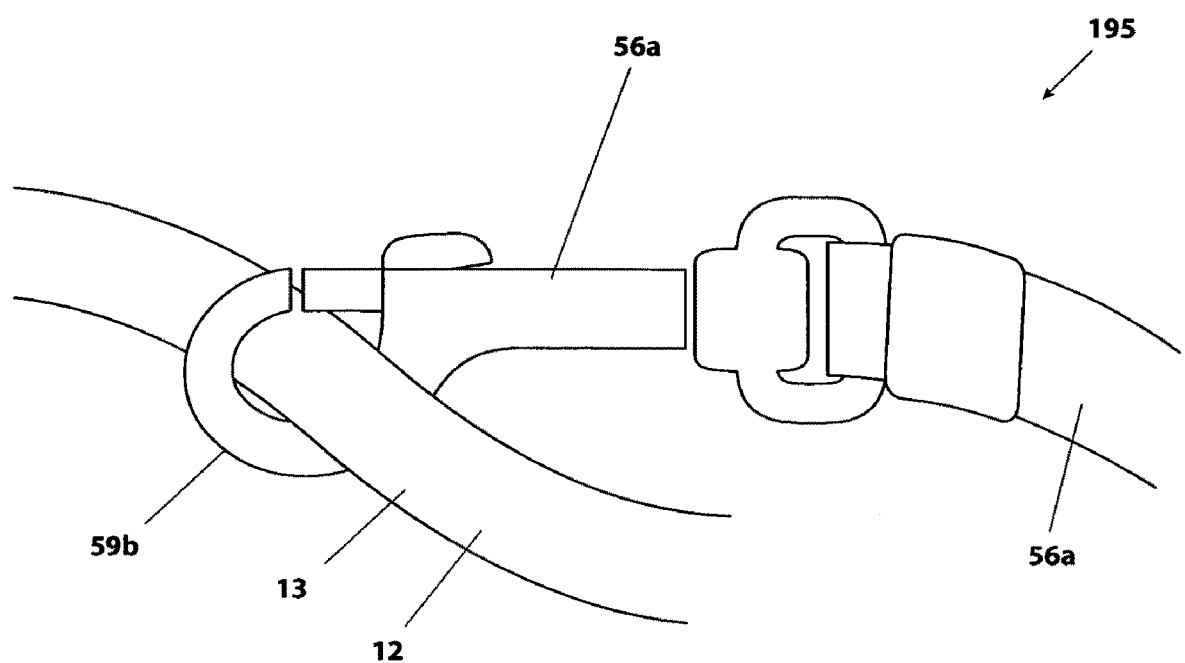
FIG. 19 is a top view of an alternate method of fastening the hook 59a to the main loop 13 of the new Double loop auto-adjust pet restraining device. The hook loop of hook is hooked directly over main loop.

In FIG. 19 shown generally at 195 is a top view of an alternate method of fastening the hook 59a to the main loop 13 of the new Double loop auto-adjust pet restraining device 12. Hook loop 59b of hook 56a is hooked directly over main loop 13, rather than using a ring.

In FIG. 19A shown generally at 196 is shown the steps taken to apply webbing and a custom label to the new Double loop auto-adjust pet restraining device. The webbing is a strong fabric made of nylon or a polypropylene material. The webbing is folded over the rope and stitched. The stitching for the webbing goes through the webbing and the rope. This makes a very strong fastening of the rope end connections. The webbing and stitching is much stronger than using stitching alone to fastening the rope ends together.

The custom label is stitched onto the webbing. Custom labels could provided to a variety of users of the new Double loop auto-adjust pet restraining device. Some possibilities for custom labels for the new Double loop auto-adjust pet restraining device include pet names, pet stores, kennels, animal boarding businesses, animal groomers, animal trainers, animal hospitals, humane societies, animal rescue operations, pet departments in major store chains, souvenir shops and specialty shops, and pet related companies such as Perina Dog Chow, etc.

DESCRIPTION OF PRIOR ART

Figure 20:
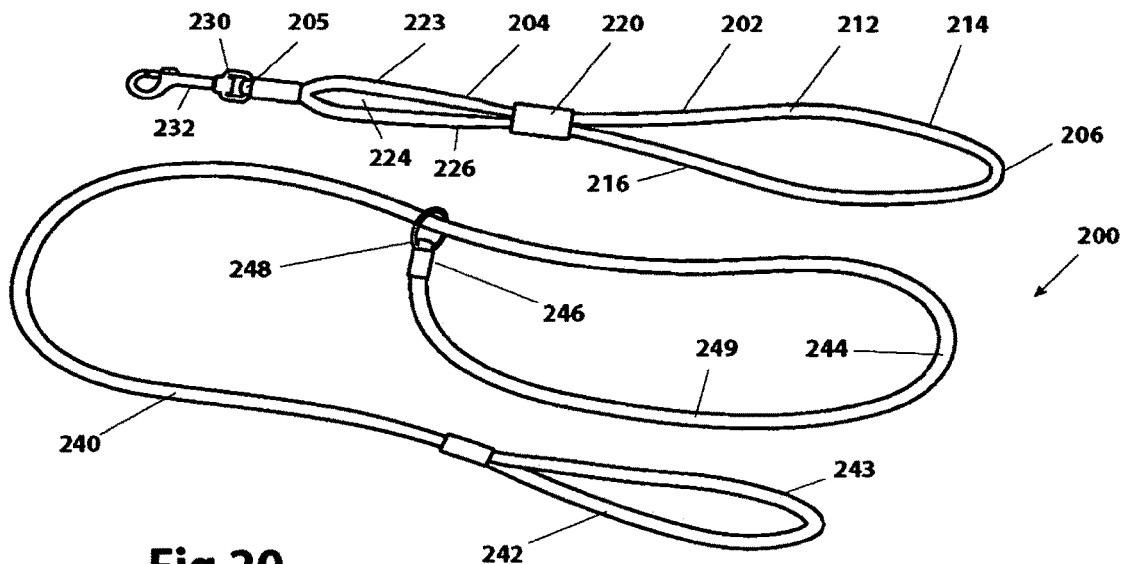
FIG. 20. Is a top view of two prior art pet restraining devices.

In FIG. 20 is shown generally shown at 200 is a top view of two prior art pet restraining devices. These devices are commonly referred to as grooming loops. The first grooming loop 202 has main loop 204 has a top end 205 and a bottom end 206. Main loop 202 has a bottom loop 212 that has first side 214 and a second side 216. Main loop 204 has a top loop 223 that has first side 224 and a second side 226. Sliding snugger 220 slides along main loop 204 and forms bottom loop 212 and top loop 223. Top end 205 has ring 230 secured thereto and a hook 232. Hook 232 has end that opens.

The second grooming loop 240 has a first end 242 that has a fastening loop 243 and a loop end 244. End 246 has a ring 248. Restraining loop 249 is formed to restrain pets. This generally is referred to a choker style grooming loop.

Figure 21:
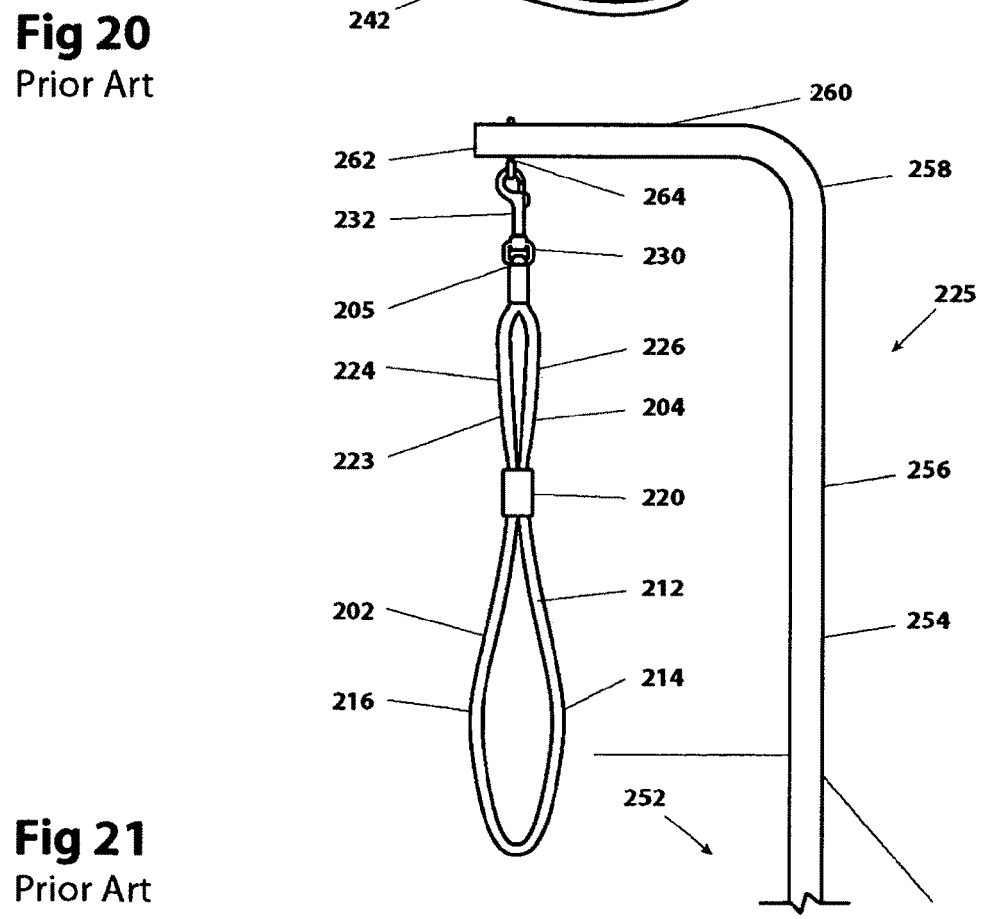
FIG. 21. Is a front view of a prior art pet restraining device hanging from a grooming arm.

In FIG. 21 is shown generally shown at 225 is a front view a prior art grooming loop 202 hanging from a grooming arm 254. Grooming loop 202 has main loop 204 that has a top end 205 and a bottom end 206. Main loop 204 has a bottom loop 212 that has first side 214 and a second side 216. Main loop 204 has a top loop 223 that has first side 224 and a second side 226. Sliding snugger 220 slides along main loop 204 and forms bottom loop 212 and top loop 223. Top of main loop 205 has ring 230 secured thereto and a hook 232. Hook 232 has end that opens. Surface of grooming table 252 is where a pet would be positioned. Grooming arm 254 has a vertical section 256 a curved section 258 and a horizontal section 260. Grooming arm terminates in end 262 that has a loop 264 that hook 232 of the prior art grooming loop 202 is fastened thereto.

Figure 22:
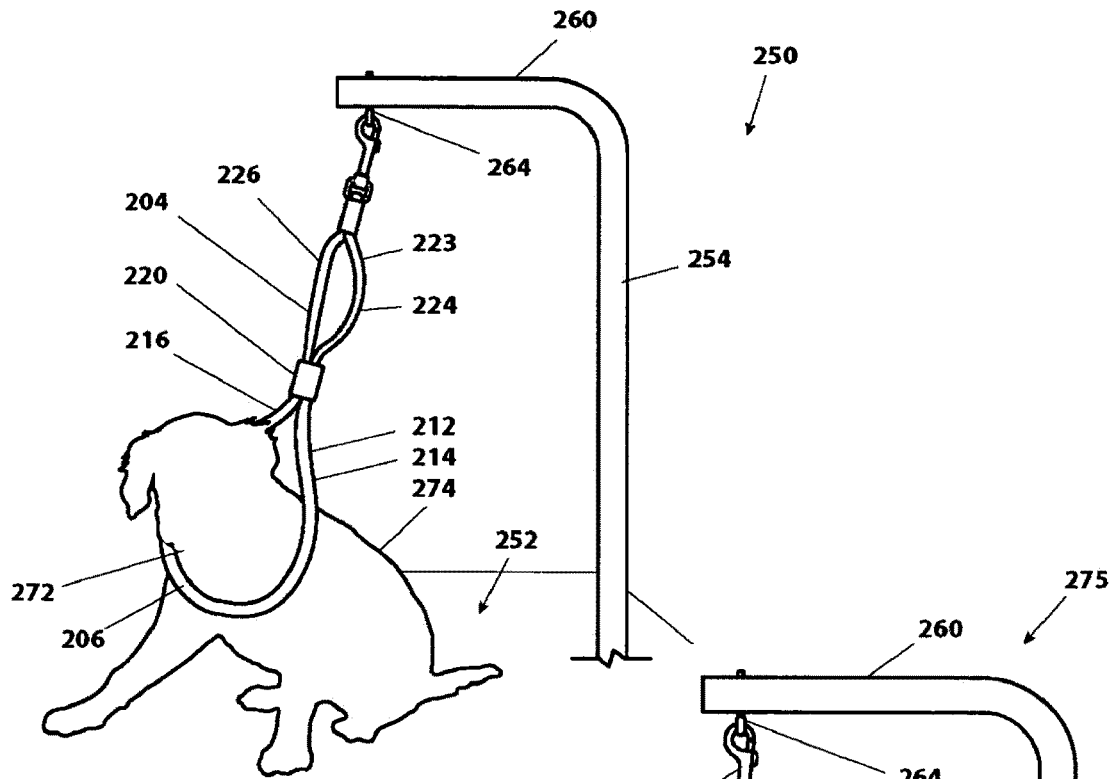
FIG. 22. Is a front view of a prior art pet restraining device hanging from a grooming arm. A dog is on top of a grooming table and is restrained by the prior art pet restraining device.

In FIG. 22 is shown generally shown at 250 is a front view a prior art grooming loop 202 hanging from a grooming arm 254 with grooming loop 202 around the neck 272 of dog 274. Grooming loop 202 has main loop 204 has a top end 205 and a bottom end 206. Main loop 202 has a bottom loop 212 that has first side 214 and a second side 216. Main loop 204 has a top loop 223 that has first side 224 and a second side 226. Sliding snugger 220 slides along main loop 204 and forms bottom loop 212 and top loop 223. Top of main loop 205 has ring 230 secured thereto and a hook 232. Hook 232 has end that opens. Surface of grooming table 252 is where dog 274 is positioned. Grooming arm 254 has a vertical section 256 a curved section 258 and a horizontal section 260. Grooming arm terminates in end 262 that has a loop 264 that hook 232 of the prior art grooming loop is fastened thereto. All of the restraining forces of this prior art grooming device are directed at throat area of the pet when the pet is retained.

Figure 23:
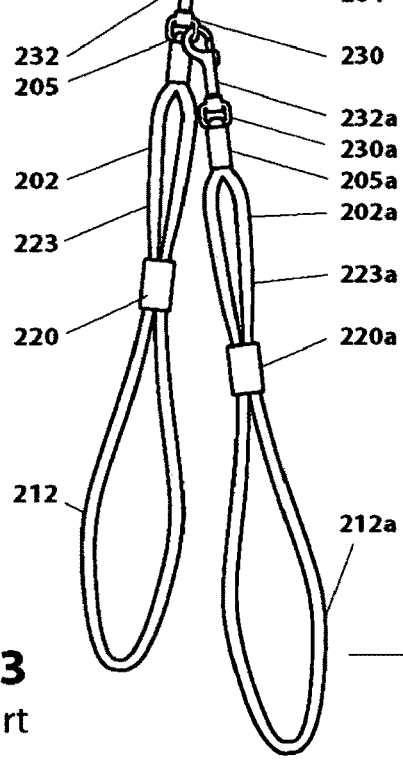
FIG. 23. Is a front view of two prior art pet restraining devices hanging from a grooming arm.

In FIG. 23 is shown generally shown at 275 is a front view a two prior art grooming loops hanging from a grooming arm 260. First grooming loop 202 has a bottom loop 212 and a top loop 223. Top of main loop 205 has ring 230 secured thereto and a hook 232. Hook 232 has end that opens and is attached to loop 264 of grooming arm 260. Second rooming loop 202a has a bottom loop 212a and a top loop 223a. Sliding snugger 220a slides and forms bottom loop 212a and top loop 223a. Top loop of main loop 205a has ring 230a secured thereto and a hook 232a. Hook 232a has end that opens. Hook 232a on second grooming loop 202a is fastened to loop 230 on first grooming loop 202.

Figure 24:
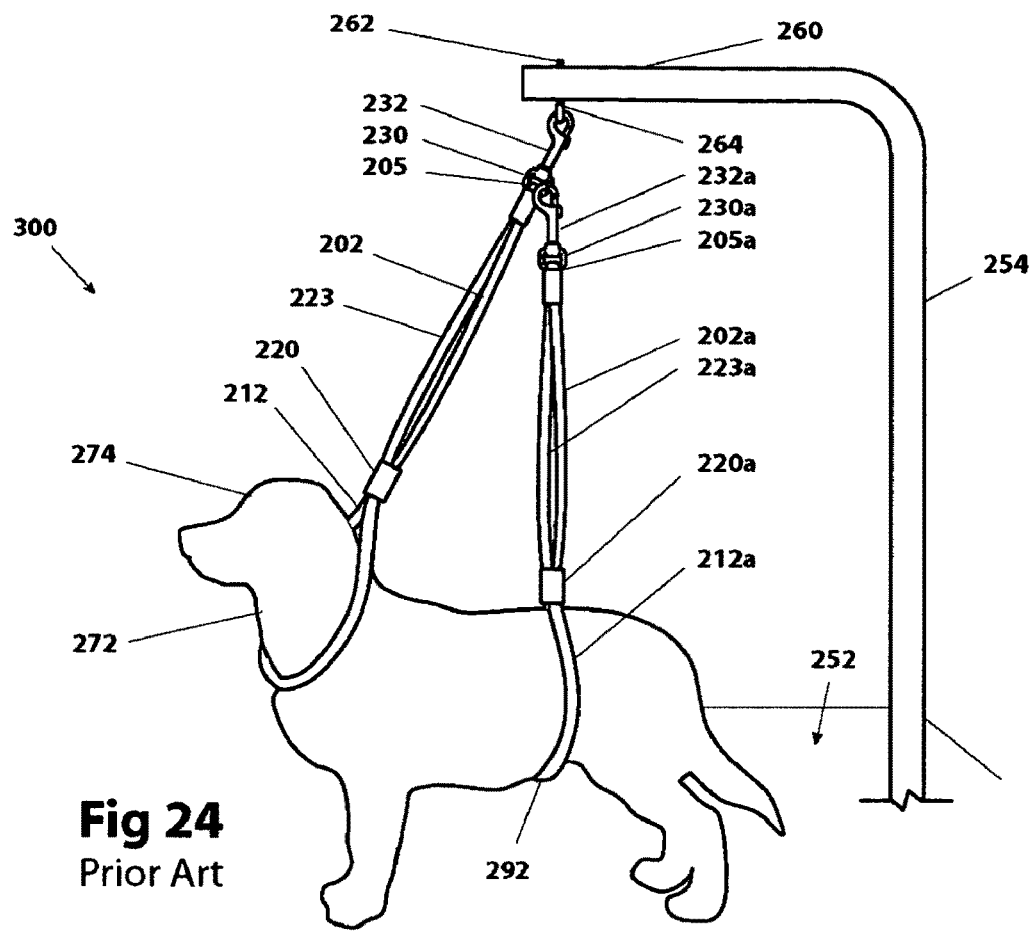
FIG. 24. Is a front view of two prior art pet restraining devices hanging from a grooming arm. A dog is on top of a grooming table and is restrained by the two prior art restraining devices.

In FIG. 24 is shown generally shown at 300 is a front view a two prior art grooming loops hanging from a grooming arm 260 with a dog 274 being restrained by the prior art grooming loops. First rooming loop 202 has a bottom loop 212 and a top loop 223. Sliding snugger 220 slides and forms bottom loop 212 and top loop 223. Top of main loop 205 has ring 230 secured thereto and a hook 232. Hook 232 is fastened to loop 264 of grooming arm 254. Bottom loop 212 of first grooming loop 202 is positioned around neck 272 of dog 274. All of the restraining forces of this prior art grooming device are directed at throat area of the pet when the pet is retained.

Second grooming loop 202a has a bottom loop 212a and a top loop 223a. Sliding snugger 220a slides and forms bottom loop 212a and top loop 223a. Top loop of main loop 205a has ring 230a secured thereto and a hook 232a. Hook 232a has end that opens. Hook 232a on second grooming loop 202a is fastened to loop 230 on first grooming loop 202. Bottom loop 212a of second grooming loop 202a is positioned around belly 292 of dog 274. All of the restraining forces of this prior art grooming device are directed at the sensitive under belly area of the pet when the pet is retained.

Figure 25:
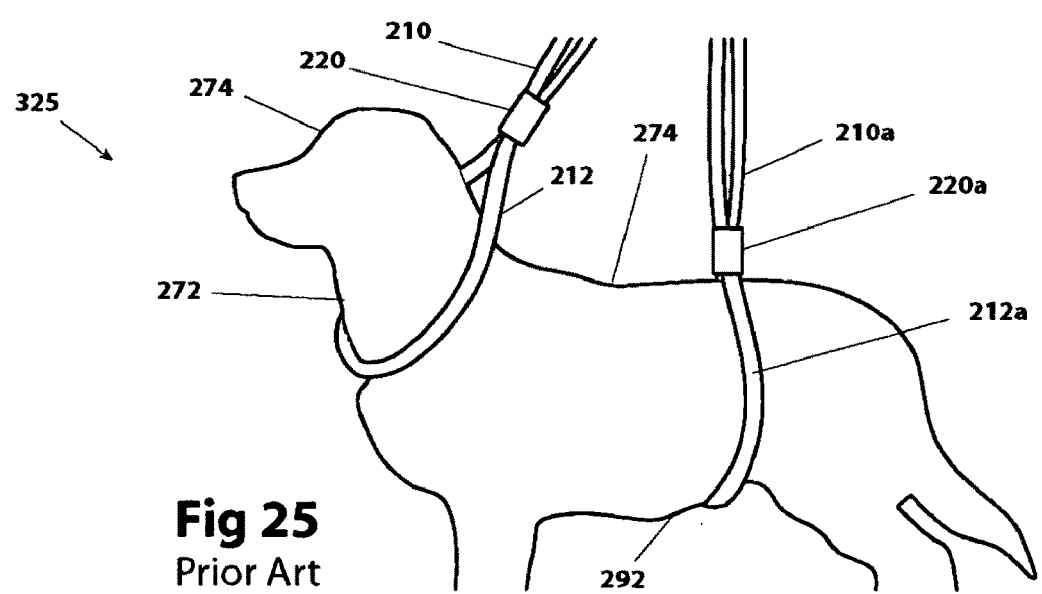
FIG. 25. Is a closeup side view a dog being restrained by two prior art pet restraining devices.

In FIG. 25 is shown generally shown at 325 is a closeup view of two prior art grooming loops hanging from a grooming arm with a dog 274 being restrained by the prior art grooming loops. First rooming loop 202 has a bottom loop 212. Sliding snugger 220 slides and forms bottom loop 212. Bottom loop 212 of first grooming loop 202 is positioned around neck 272 of dog 274. All of the restraining forces of this prior art grooming device are directed at the sensitive throat area of the pet when the pet is retained.

Second grooming loop 202a has a bottom loop 212a. Sliding snugger 220a slides and forms bottom loop 212a. Bottom loop 212a of second grooming loop 202a is positioned around belly 292 of dog 274. All of the restraining forces of this prior art grooming device are directed at the sensitive under belly area of the pet when the pet is retained.

The objects and advantages of the invention will become apparent when the drawings are studied in conjunction with reading the description and the claims.

This invention having been described in its presently contemplated best mode, it is clear that it is susceptible to numerous, variations, modifications, modes and embodiments within the ability of those skilled in the art and without departing from the true spirit and scope of the novel concepts or principles of this invention. Also, it is to be understood that the phraseology and terminology employed herein are for the purpose of description and should not be regarded as limiting. It should be understood that the preferred embodiment has been shown and described and that all changes and modifications that come within the spirit of the invention are desired to be protected. The invention is capable of other embodiments and of being practiced and carried out in various ways. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention. Accordingly, the scope of the invention is defined by the scope of the following claims.

What is claimed as new and desired to be secured by the United States Letters Patent is:

1. A self adjusting animal restraining harness comprising:
   A coupling device having an open position and a closed position;
   a loop that is made of a flexible material; said loop is linked to said coupling device:
   a first flexible collar section having a collar first end and a collar second end;
   a first ring; said first ring is coupled to said first collar first end; said loop passes through said first ring;
   a second ring; said second ring is coupled to said first collar second end; said loop passes through second ring;
   a second flexible collar section having a collar first end and a collar second end;
   a third ring; said third ring is coupled to said second collar first end; said loop passes through said third ring;
   a hook device; said hook device having an open position and a closed position; said hook device is coupled to said second collar second end;
   a sliding snugger that is slidable along said flexible loop;
   whereby a uniform restraining force is applied around the perimeter of the neck of said animal when said neck of said animal is restrained between said flexible loop and said first flexible collar section.

2. The self adjusting animal restraining harness of claim 1 including a fourth ring; said loop passes through said fourth ring.

3. The self adjusting animal restraining harness of claim 1 wherein said coupling device is a hook, or said coupling device is a hook that has a swivel feature, or said coupling device is a scissors snap hook, or said coupling device is spring snap hook, or said coupling device is a acetyl snap hook, or said coupling device is a spring hook, or said coupling device is safety hook, or said coupling device is made of a metal, or said coupling device is stainless steel, or said coupling device is made of aluminum, or said coupling device is made of brass, or said coupling device is made of steel, or said coupling device is made of a plastic material.

4. The self adjusting animal restraining harness of claim 1 wherein a custom label is securely fastened onto said loop; or a custom label is sewn onto said loop; said custom label having a company name thereon, or a logo thereon, or a product name thereon, or information thereon, or a pet name thereon.

5. The self adjusting animal restraining harness of claim 1 wherein a leash section is linked to said coupling device.

6. The self adjusting animal restraining harness of claim 1 wherein said coupling device is sized to engage a seatbelt on a motor vehicle.

7. A self adjusting animal restraining harness comprising:
   A coupling device having an open position and a closed position;
   a loop that is made of a flexible material; said loop is linked to said coupling device:
   a first flexible collar section having a collar first end and a collar second end;
   a first ring; said first ring is coupled to said first collar first end; said loop passes through said first ring;
   a second ring; said second ring is coupled to said first collar second end; said loop passes through second ring;
   a second flexible collar section having a collar first end and a collar second end;
   a third ring; said third ring is coupled to said second collar first end; said loop passes through said third ring;
   a hook device; said hook device having an open position and a closed position; said hook device is coupled to said second collar second end;
   a fourth ring; said loop passes through said fourth ring;
   a first sliding snugger that is slidable along said flexible loop; and,
   a second sliding snugger that is slidable along said flexible loop;
   whereby a uniform restraining force is applied around the perimeter of the neck of said animal when said neck of said animal is restrained between said flexible loop and said first flexible collar section of.

8. The self adjusting animal restraining harness of claim 7 wherein said coupling device is a hook, or said coupling device is a hook that has a swivel feature, or said coupling device is a scissors snap hook, or said coupling device is spring snap hook, or said coupling device is a acetyl snap hook, or said coupling device is a spring hook, or said coupling device is safety hook, or said coupling device is made of a metal, or said coupling device is stainless steel, or said coupling device is made of aluminum, or said coupling device is made of brass, or said coupling device is made of steel, or said coupling device is made of a plastic material.

9. The self adjusting animal restraining harness of claim 7 wherein a custom label is securely fastened onto said loop; or a custom label is sewn onto said loop; said custom label having a company name thereon, or a logo thereon, or a product name thereon, or information thereon, or a pet name thereon.

10. A self adjusting animal restraining harness comprising:
    a loop that is made of a flexible material;
    a first flexible collar section having a collar first end and a collar second end;
    a first ring; said first ring is coupled to said first collar first end; said loop passes through said first ring;
    a hook device; said hook device having an open position and a closed position; said hook device is coupled to said first collar second end;
    a second flexible collar section having a collar first end and a collar second end;
    a second ring; said second ring is coupled to said second collar first end; said loop passes through said second ring;
    a second hook device; said second hook device having an open position and a closed position; said second hook device is coupled to said second collar second end;
    a sliding snugger that is slidable along said flexible loop.

11. The self adjusting animal restraining harness of claim 10 including a third ring; said loop passes through said third ring.

12. The self adjusting animal restraining harness of claim 10 including a coupling device that is linked to said loop; said coupling device having an open position and a closed position.

13. The self adjusting animal restraining harness of claim 10 including a coupling device that is linked to said loop; said coupling device having an open position and a closed position;
    and including a leash section that is linked to said coupling device.

14. The self adjusting animal restraining harness of claim 10 including a leash section that is linked to said loop.

15. A self adjusting animal restraining harness comprising:
    a loop that is made of a flexible material;
    a first flexible collar section having a collar first end and a collar second end;
    a first ring; said first ring is coupled to said first collar first end; said loop passes through said first ring;
    a second ring; said second ring is coupled to said first collar second end; said loop passes through second ring;
    a second flexible collar section having a collar first end and a collar second end;
    a third ring; said third ring is coupled to said second collar first end; said loop passes through said third ring;
    a hook device; said hook device having an open position and a closed position; said hook device is coupled to said second collar second end;
    a sliding snugger that is slidable along said flexible loop;
    a leash section that is made of a flexible material; said leash section having a first end and a second end; said first end of said leash section is linked to said loop;
    whereby a uniform restraining force is applied around the perimeter of the neck of said animal when said neck of said animal is restrained between said flexible loop and said first flexible collar section of.

16. The self adjusting animal restraining harness of claim 15 including a fourth ring; said loop passes through said fourth ring.

17. The self adjusting animal grooming harness of claim 15 wherein said leash and loop are made of one piece of flexible material.

18. The self adjusting animal grooming harness of claim 15 wherein said second end of said leash has loop thereon.

* * * * *